US 8,745,139 B2

(12) United States Patent
Demarta et al.

(10) Patent No.: US 8,745,139 B2
(45) Date of Patent: Jun. 3, 2014

(54) CONFIGURING CHANNELS FOR SHARING MEDIA

(75) Inventors: Stanley Peter Demarta, Pleasanton, CA (US); David Jack Ovadia, Danville, CA (US); Peter W. Winer, Los Altos, CA (US); Jonathan Benjamin Korman, San Francisco, CA (US); David Ben-Yaakov, San Ramon, CA (US); Ariel Braunstein, San Francisco, CA (US); Philip C. Kim, San Francisco, CA (US); Jonathan Kaplan, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 318 days.

(21) Appl. No.: 12/576,158

(22) Filed: Oct. 8, 2009

(65) Prior Publication Data

US 2010/0299391 A1    Nov. 25, 2010

Related U.S. Application Data

(60) Provisional application No. 61/180,820, filed on May 22, 2009.

(51) Int. Cl.
*G06F 15/16*    (2006.01)
(52) U.S. Cl.
USPC .......................................... 709/205; 709/206

(58) Field of Classification Search
None
See application file for complete search history.

(56) References Cited

U.S. PATENT DOCUMENTS

| 7,136,903 | B1 | 11/2006 | Phillips et al. | |
|---|---|---|---|---|
| 7,689,920 | B2 * | 3/2010 | Robbin et al. | 715/741 |
| 7,752,265 | B2 * | 7/2010 | Svendsen et al. | 709/205 |
| 2002/0138843 | A1 | 9/2002 | Samaan et al. | |
| 2007/0124737 | A1 * | 5/2007 | Wensley et al. | 719/314 |
| 2007/0283385 | A1 * | 12/2007 | Qiu et al. | 725/34 |
| 2008/0189293 | A1 | 8/2008 | Strandel et al. | |
| 2008/0208963 | A1 | 8/2008 | Eyal et al. | |
| 2008/0263103 | A1 | 10/2008 | McGregor et al. | |
| 2009/0131177 | A1 | 5/2009 | Pearce | |
| 2009/0265426 | A1 * | 10/2009 | Svendsen et al. | 709/204 |
| 2010/0100596 | A1 * | 4/2010 | Strandell et al. | 709/206 |

OTHER PUBLICATIONS

International Search Report for PCT/US10/35306 dated Jul. 14, 2010.

* cited by examiner

*Primary Examiner* — Umar Cheema
(74) *Attorney, Agent, or Firm* — Patterson & Sheridan, LLP

(57) ABSTRACT

A user interface for sharing media items with others. From a sender's perspective, embodiments of the invention allow for an easy-to-use drag-and-drop technique that is more user-friendly than conventional techniques. From the recipient's perspective, embodiments of the invention allow media items from multiple sources to be aggregated into a single viewport, providing a cohesive and unified approach to media items received from others.

14 Claims, 16 Drawing Sheets

FIG. 16

CONFIGURING CHANNELS FOR SHARING MEDIA

CROSS-REFERENCE TO RELATED APPLICATIONS

This application claims benefit of U.S. provisional patent application Ser. No. 61/180,820 filed on May 22, 2009, which is hereby incorporated herein by reference.

BACKGROUND OF THE INVENTION

1. Field of the Invention

Embodiments of the present invention generally relate to computer software and, more specifically, to configuring channels for sharing media.

2. Description of the Related Art

Digital video camera (DVC) technology has developed rapidly over the past decade. DVC technology provides a user with a convenient device that records video and audio and also provides the ability to transfer the recorded video and audio to a computer-readable medium. A DVC user typically records video and audio by activating a recording mode of the DVC and pointing the lens of the DVC towards an area of interest to record the subject matter in that area. Once video and audio data is recorded on the DVC, the data may be transferred to a computer memory via a cord or connector that couples the DVC to a computer or output to a television (TV). Common types of connectors provided with DVCs are universal serial bus (USB) connectors, firewire connectors, High-Definition Multimedia Interface (HDMI) connectors, proprietary connectors, or other types of connectors that may be used to transfer data. Some DVCs may include a cord that connects the DVC to the computer; whereas, other DVCs may include a connector that protrudes from the DVC and can be plugged directly into a computer.

A problem often encountered by DVC users involves sharing captured media with others. One conventional technique for sharing media with another is to email the media to another individual as an attachment. This technique has several drawbacks. First, the file size may be too large for the recipient's email server to handle properly. Second, if the recipient accidentally loses or deletes the email, then the recipient will no longer have access to the media. A second technique for sharing media with others involves publishing the video on the Internet on a media publishing website, e.g., YouTube.com. However, one problem with publishing media is that anyone with Internet access can view the media that the user publishes on the website. Accordingly, the sender is not able to target only certain recipients via the media publishing website.

Accordingly, there remains a need in the art for a technique to more effectively share media with others that overcomes one or more of limitations of conventional approaches set forth above.

SUMMARY

One embodiment of the invention provides a computer-implemented method for organizing media items in a viewport application. The method includes causing a representation of a first media item associated with a first channel defined by a first set of media items that includes the first media item and a first set of recipients to be displayed in a first portion of a viewport generated when the viewport application executes on a computer system; receiving a user selection to access the first media item; and displaying the first portion of the viewport on a display device associated with the computer system.

Another embodiment of the invention provides a computer-implemented method for sharing media items with one or more persons. The method includes selecting a first media item; associating the first media item with a first channel defined by a set of media items that includes the first media item and a set of recipients that includes a first recipient; and initiating a transfer of the first media item from a first computing device to a server computing device, where the first media item is stored on the server computing device, and where the first recipient is permitted to access the first media item from the server computing device via a second computing device.

Yet another embodiment of the invention provides a computer system configured to enable media items to be shared between two or more persons. The computer system includes a processor configured to receive a media item from a first computing device, where the media item is included in a channel that is associated with a first set of media items and a first set of recipients; store the media item in a storage memory; and allow each of the recipients included in the first set of recipients to access the media item from one or more other computing devices.

BRIEF DESCRIPTION OF THE DRAWINGS

FIG. 16 is a screenshot of a viewport configured to allow a recipient to configure the settings of the viewport, according to one embodiment of the invention.

DESCRIPTION OF EXAMPLE EMBODIMENTS

Figure 1:
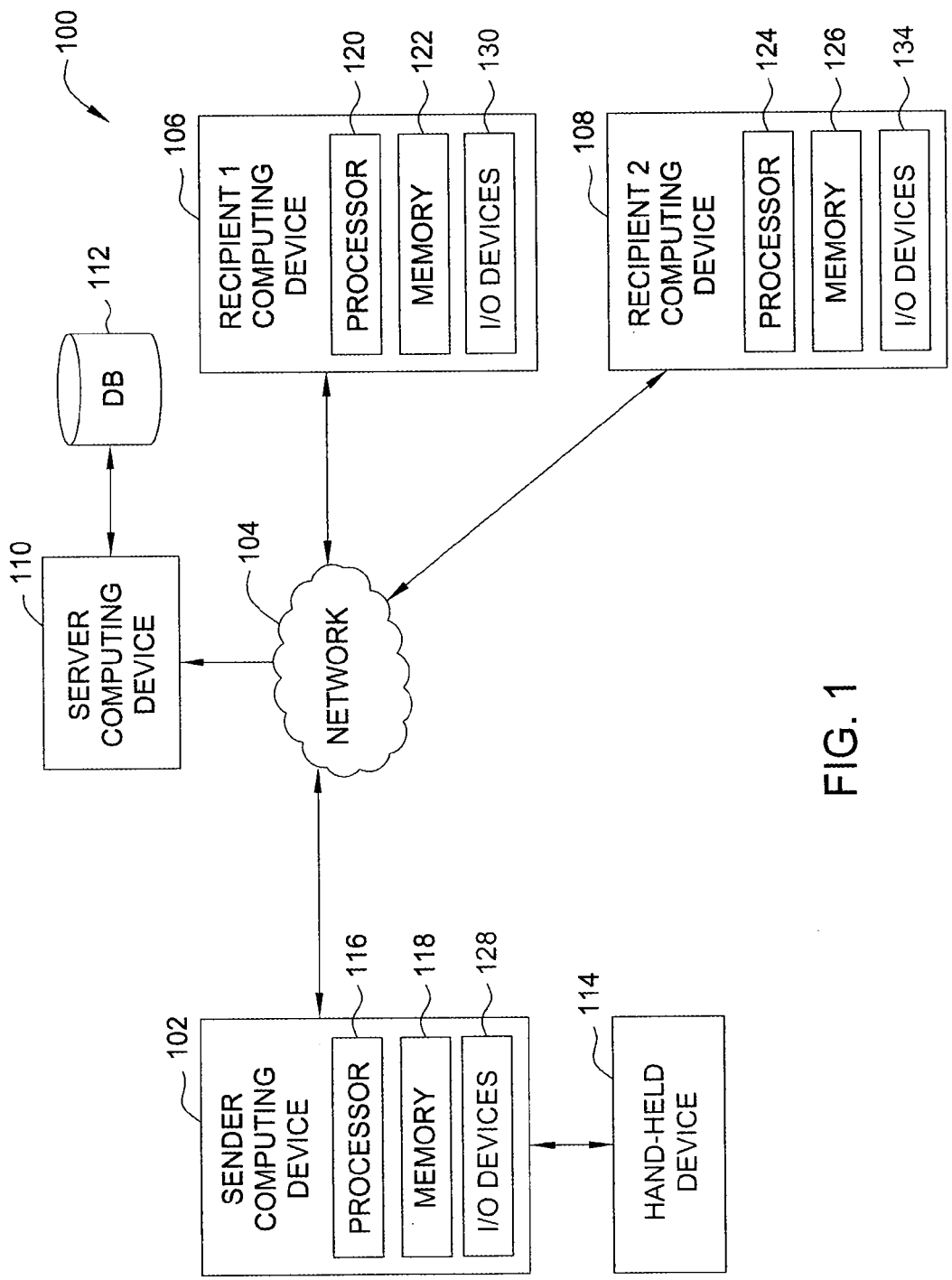
FIG. 1 is a block diagram illustrating components of a system configured to implement one or more aspects of the present invention.

FIG. 1 is a block diagram illustrating components of a system 100 configured to implement one or more aspects of the present invention. As shown, the system 100 includes a sender computing device 102, a network 104, a first recipient computing device 106, a second recipient computing device 108, a server computing device 110, a database 112, and a hand-held device 114.

Each of the sender computing device 102, the first recipient computing device 106, the second recipient computing device 108, and the server computing device 110 may be any technically feasible type of computing system. In an alternative embodiment, the computing devices 102, 106, 108 may comprise a web-enabled television, a mobile phone, or a computer monitor that includes computing hardware, among others.

The computing devices 102, 106, 108, 110 are coupled to one another via the network 104 and may transmit and receive data across the network 104. The network 104 may be any type of network, including the World Wide Web, the Internet, a local area network (LAN), a wide area network (WAN), an intranet, a cellular network, or any other technically feasible type of network.

The sender computing device 102 includes a processor 116, a memory 118, and input/output (I/O) devices 128. The processor 116 is coupled to the I/O devices 128 and to the memory 118. The processor 116 is the primary processor of the sender computing device 102. The processor 116 may be a single-core processor, a multi-core processor, an application-specific integrated circuit (ASIC), a field-programmable gate array (FPGA), a graphics processing unit (GPU), or a combination of processing units. The processor 116 is configured to execute program instructions stored in the memory 118. The program instructions may include software applications, drivers, and/or operating systems. In one embodiment, the software application provides a user interface that allows a sender to share one or more media items with one or more recipients with a channel, as described in greater detail herein.

The I/O devices 128 may include a keyboard, a mouse, a monitor, a speaker, a switch, a touchscreen, a universal serial bus (USB) port, a firewire port, a serial port, an Ethernet port, a disk drive, a flash drive, or a wireless network card, among others. In one embodiment, the I/O devices 128 are used to transmit data to and receive data from the network 104. In another embodiment, the I/O devices 128 can be used to store data in the memory 118.

The memory 118 may be any type of memory unit, including a random-access memory (RAM) unit, a dynamic RAM (DRAM) unit, a hard disk drive, or a flash memory module, among others. The memory 118 is configured to store software applications, drivers, and/or operating systems. In one embodiment, the memory 118 stores a software application that, when executed by the processor 116, provides a user interface for sharing media items with recipients.

The first recipient computing device 106 includes a processor 120, a memory 122, and I/O devices 130. The processor 120 is coupled to the I/O devices 130 and to the memory 122. The processor 120 is the primary processor of the first recipient computing device 106. The processor 120 may be a single-core processor, a multi-core processor, an ASIC, an FPGA, a GPU, or a combination of processing units. The processor 120 is configured to execute program instructions stored in the memory 122. The program instructions may include software applications, drivers, and/or operating systems. In one embodiment, the software applications include one or more programs configured to provide a user interface for a viewport in which multiple streams of shared media items are aggregated.

The I/O devices 130 may include a keyboard, a mouse, a monitor, a speaker, a switch, a touchscreen, a USB port, a firewire port, a serial port, an Ethernet port, a disk drive, a flash drive, or a wireless network card, among others. In one embodiment, the I/O devices 130 are used to transmit data to and receive data from the network 104. In another embodiment, the I/O devices 130 can be used to store data in the memory 122.

The memory 122 may be any type of memory unit, including a random-access memory (RAM) unit, a dynamic RAM (DRAM) unit, a hard disk drive, or a flash memory module, among others. The memory 122 is configured to store software applications, drivers, and/or operating systems. In one embodiment, the memory 122 stores a software application that, when executed by the processor 120, provides a user interface for receiving shared media.

The second recipient computing device 108 includes a processor 124, a memory 126, and I/O devices 132. In one embodiment, the processor 124, the memory 126, and the I/O devices 132 included in the second recipient computing device 108 are substantially similar to the processor 120, the memory 122, and the I/O devices 130, respectively, included in the first recipient computing device 106, and are not described in greater detail herein.

In the system 100 illustrated in FIG. 1, two different recipient computing devices 106, 108 are shown. In alternative embodiments, the system 100 may include one recipient computing device, or more than two different recipient computing devices. Similarly, in the system 100 illustrated in FIG. 1, one sender computing device 102 is shown. In alternative embodiments, the system 100 may include two or more different sender computing devices. In still further embodiments, a particular computing device may be both a sender computing device and a recipient computing device, as described in greater detail herein.

The server computing device 110 includes a processor, a memory, and I/O devices (none shown). Similar to the processors 116, 120, 124 included in the other computing devices 102, 106, 108 shown in FIG. 1, the processor included in the server computing device 110 is coupled to the I/O devices and to the memory. The processor is the primary processor of the server computing device 110. The processor may be a single-core processor, a multi-core processor, an ASIC, an FPGA, a GPU, or a combination of processing units. In some embodiments, the processor may be configured to execute program instructions stored in the memory. The program instructions may include software applications, drivers, and/or operating systems. In one embodiment, the software applications may include a program that allows for the sharing of one or more media items between a sender and one or more recipients via a channel.

Additional details of a computing device, such as one or more of the computing devices 102, 106, 108, 110, are described below in greater detail in FIG. 2.

As shown, the server computing device 110 is coupled to a database 112. The database 112 may be any technically feasible type of storage device. In one embodiment, the database 112 stores the media items being shared between a sender and one or more recipients via channels. In some embodiments, the database 112 is included within the server computing device 110.

The hand-held device 114 may be any technically feasible type of hand-held device, including, for example, a digital video camera, a digital photo camera, or a cellular phone. An example of a hand-held device 114 is described below in greater detail in FIG. 3.

Figure 2:
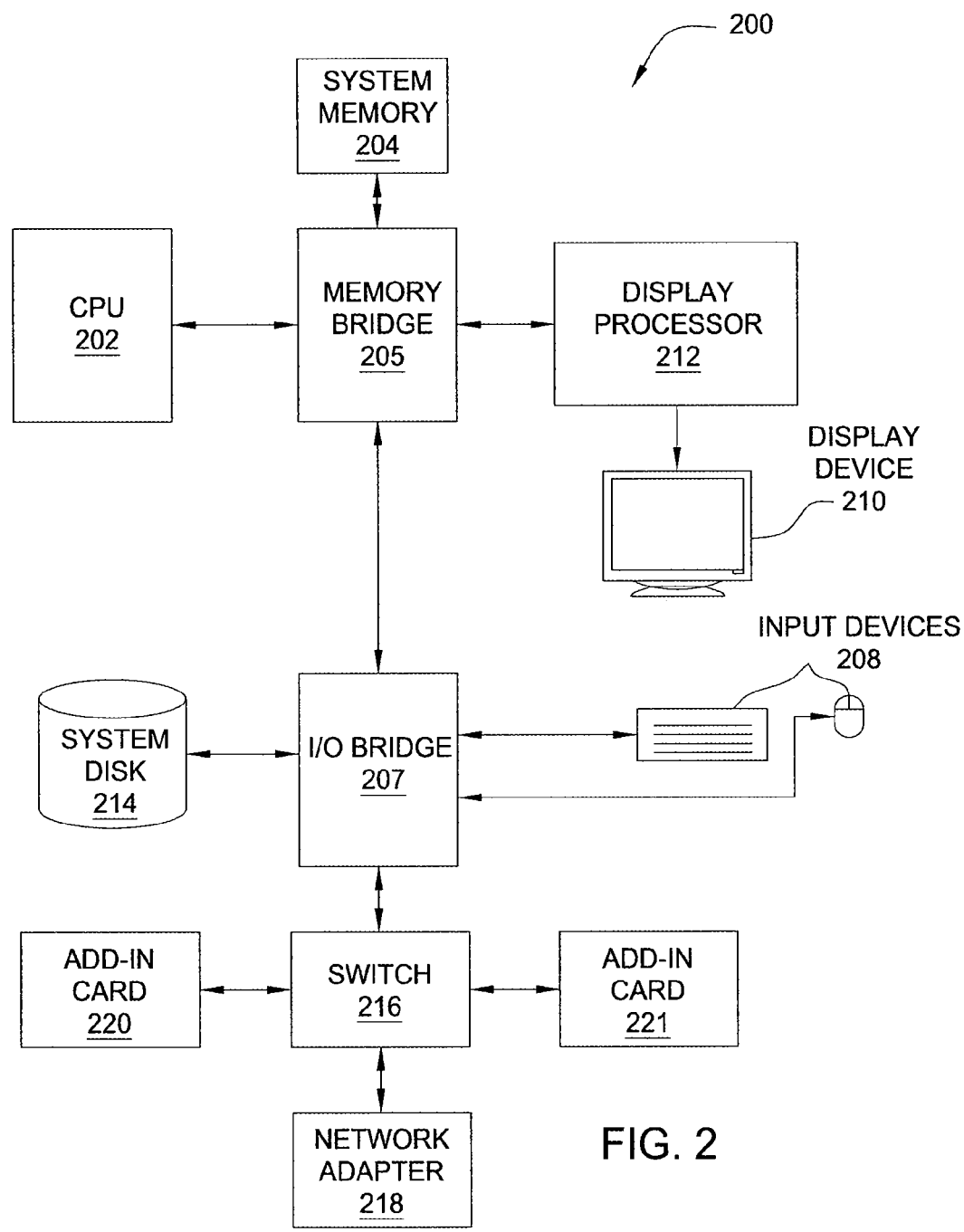
FIG. 2 is a block diagram of a computing device, according to one embodiment of the invention.

FIG. 2 is a block diagram of a computing device 200, according to one embodiment of the invention. The computing device 200 is one embodiment of a configuration of one or more of the computing devices 102, 106, 108, 110, shown in FIG. 1. Computing device 200 may be a personal computer, video game console, personal digital assistant, rendering engine, mobile phone, web-enabled TV, set-top box, or any other device suitable for practicing one or more embodiments of the present invention.

As shown, computing device 200 includes a CPU 202 and a system memory 204 communicating via a bus path that may include a memory bridge 205. CPU 202 includes one or more processing cores, and, in operation, CPU 202 is the master processor of computing device 200, controlling and coordinating operations of other system components. System memory 204 stores software, applications and data for use by CPU 202. CPU 202 runs software applications and optionally an operating system. Memory bridge 205, which may be, e.g., a Northbridge chip, is connected via a bus or other communication path (e.g., a HyperTransport link) to an I/O (input/output) bridge 207. I/O bridge 207, which may be, e.g., a Southbridge chip, receives user input from one or more user input devices 208 (e.g., keyboard, mouse, joystick, digitizer tablets, touch pads, touch screens, still or video cameras, motion sensors, and/or microphones) and forwards the input to CPU 202 via memory bridge 205.

A display processor 212 is coupled to memory bridge 205 via a bus or other communication path (e.g., a PCI Express, Accelerated Graphics Port, or HyperTransport link); in one embodiment display processor 212 is a graphics subsystem that includes at least one GPU and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 204.

Display processor 212 periodically delivers pixels to a display device 210 (e.g., a screen or conventional CRT, plasma, OLED, SED or LCD based monitor or television). Additionally, display processor 212 may output pixels to digital recorders adapted to reproduce computer generated images on digital media. Display processor 212 can provide display device 210 with an analog or digital signal.

A system disk 214 is also connected to I/O bridge 207 and may be configured to store content and applications and data for use by CPU 202 and display processor 212. System disk 214 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 216 provides connections between I/O bridge 207 and other components such as a network adapter 218 and various add-in cards 220 and 221. Network adapter 218 allows computing device 200 to communicate with other systems via an electronic communications network, and may include wired or wireless communication over local area networks and wide area networks such as the Internet.

Other components (not shown), including USB or other port connections, film recording devices, and the like, may also be connected to I/O bridge 207. For example, an audio processor may be used to generate analog or digital audio output from instructions and/or data provided by CPU 202, system memory 204, or system disk 214. Communication paths interconnecting the various components in FIG. 2 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 212 incorporates circuitry optimized for graphics and video processing, including, for example, video output circuitry, and constitutes a GPU. In another embodiment, display processor 212 incorporates circuitry optimized for general purpose processing. In yet another embodiment, display processor 212 may be integrated with one or more other system elements, such as the memory bridge 205, CPU 202, and I/O bridge 207 to form a system on chip (SoC). In still further embodiments, display processor 212 is omitted and software executed by CPU 202 performs the functions of display processor 212.

Pixel data can be provided to display processor 212 directly from CPU 202. In some embodiments of the present invention, instructions and/or data representing a scene are provided to a render farm or a set of server computers, each similar to computing device 200, via network adapter 218 or system disk 214. The render farm generates one or more rendered images of the scene using the provided instructions and/or data. These rendered images may be stored on computer-readable media in a digital format and optionally returned to computing device 200 for display. Similarly, stereo image pairs processed by display processor 212 may be output to other systems for display, stored in system disk 214, or stored on computer-readable media in a digital format.

Alternatively, CPU 202 provides display processor 212 with data and/or instructions defining the desired output images, from which display processor 212 generates the pixel data of one or more output images. The data and/or instructions defining the desired output images can be stored in system memory 204 or graphics memory within display processor 212.

It will be appreciated that the system shown herein is illustrative and that variations and modifications are possible. The connection topology, including the number and arrangement of bridges, may be modified as desired. For instance, in some embodiments, system memory 204 is connected to CPU 202 directly rather than through a bridge, and other devices communicate with system memory 204 via memory bridge 205 and CPU 202. In other alternative topologies, display processor 212 is connected to I/O bridge 207 or directly to CPU 202, rather than to memory bridge 205. In still other embodiments, I/O bridge 207 and memory bridge 205 might be integrated into a single chip. The particular components shown herein are optional; for instance, any number of add-in cards or peripheral devices might be supported. In some embodiments, switch 216 is eliminated, and network adapter 218 and add-in cards 220, 221 connect directly to I/O bridge 207.

Figure 3:
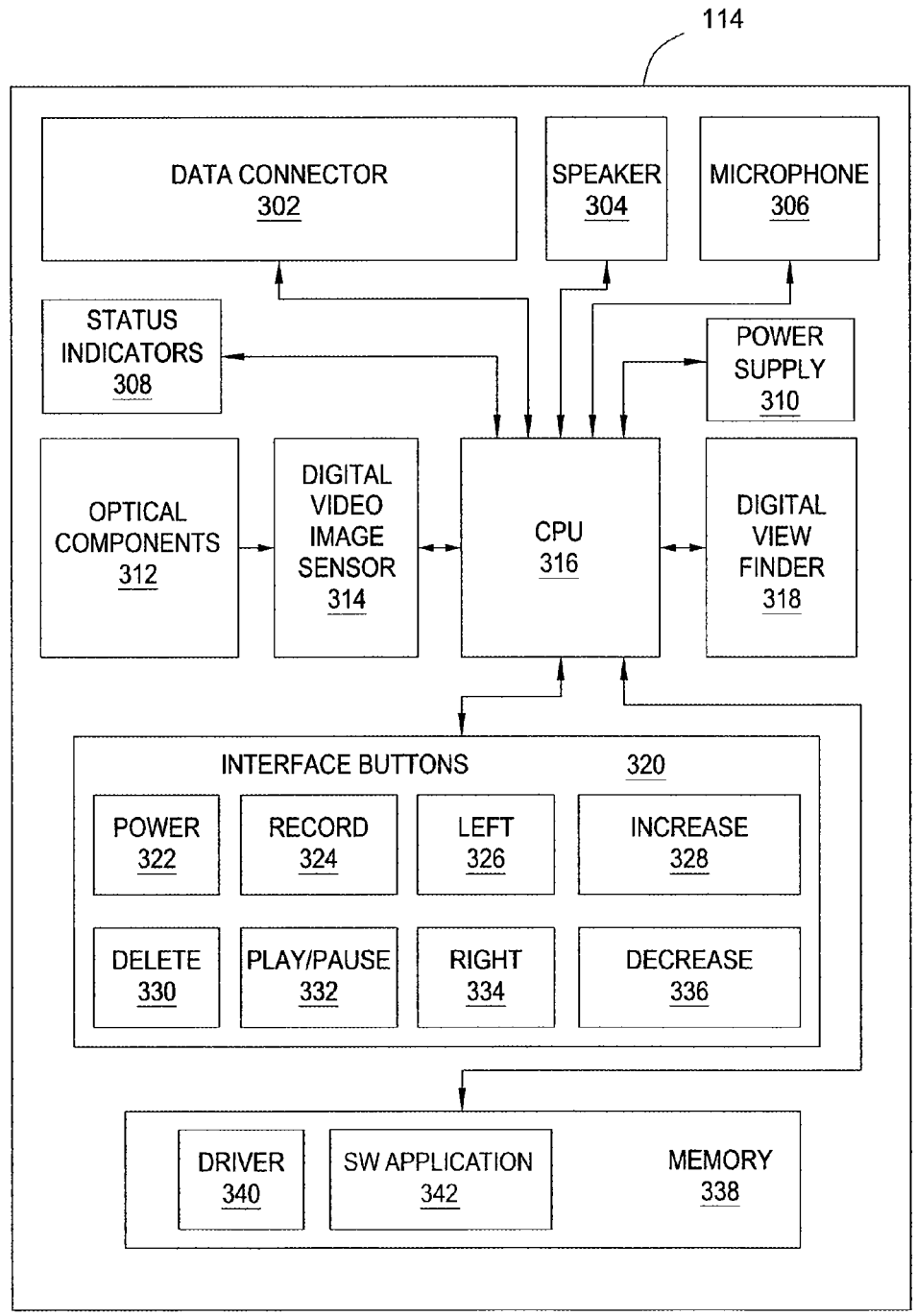
FIG. 3 is a block diagram of a hand-held device (HHD), according to one embodiment of the invention.

FIG. 3 is a block diagram of a hand-held device (HHD) 114, according to one embodiment of the invention. As shown, the HHD 114 includes, without limitation, a data connector 302, a speaker 304, a microphone 306, status indicators 308, a power supply 310, optical components 312, a digital video image sensor 314, a CPU 316, a digital viewfinder 318, interface buttons 320, and an internal memory 338. In one embodiment, the HHD 114 is a digital video camera.

The data connector 302 is an integrated mechanism that allows the HHD 114 to be connected with a separate TV or computing device, such as laptop or a desktop computer, and to transfer data to and from the computing device and/or output video and audio to the TV. The data connector 302 may be a USB connector, a firewire connector, a HDMI connector, a serial connector, or another type of connector that is capable of connecting the HHD 114 with the TV or the computing device.

The status indicators 308 visually indicate the current mode of operation of the HHD 114. The status indicators 308 include light emitting diodes (LEDs) that can be "ON," blinking, or "OFF," depending on the current operating mode of the HHD 114. The operating modes of the HHD 114 include, among others, a record mode and a playback mode. When in the record mode, the HHD 114 is configured to capture video and audio of a particular scene through the optical components 312 and the microphone 306, respectively. When in the playback mode, the HHD 114 is configured to play digital videos that are stored in the internal memory 338. The digital videos stored in the internal memory 338 may be videos captured with the HHD 114 or videos transferred to the HHD 114, but not captured by the HHD 310, including videos downloaded from the Internet. In one embodiment, the digital videos may be displayed on the digital viewfinder 318, and the audio may be output through the speaker 304. In alternative embodiments, the digital video and audio may be output to the TV or to the computer system for playback.

The power supply 310 provides power to the HHD 114. The power may be provided by a battery or an external power source (e.g., an AC outlet). In one embodiment, the battery is a rechargeable battery that is not removable from the HHD 114. In alternative embodiments, the battery may include one or more removable and/or replaceable batteries. The optical components 312, which may include one or more lenses, capture the scene and direct light associated with the scene onto the digital video image sensor 314. The digital video image sensor 314 converts the captured image into digital video data and then transmits the digital video data to the CPU 316 for further processing.

The microphone 306, similarly, captures the sound in the scene. In one embodiment, the microphone includes hardware and/or software configured to convert the captured sound to digital audio data and to transmit the digital audio data to the CPU 316 for further processing. In alternative embodiments, the microphone may transmit raw analog data to the CPU without any pre-processing.

The CPU 316 communicates with the various components within the HHD 114 to control the operations of the HHD 114. The CPU may be implemented as a single chip or as a combination of multiple chips. The CPU 316 also processes inputs from the interface buttons 320. For example, when the HHD 114 is in record mode, the CPU 316 transmits the digital video data received from the digital video image sensor 314 to the digital viewfinder 318 for display. In one embodiment, the CPU 316 combines the digital audio data received from the microphone 306 and the digital video data received from the digital video image sensor 314 to create a composite video file. The composite video file may then be transmitted to the internal memory 338 for storage. When the HHD 114 is in playback mode, the CPU 316 retrieves the composite video file from the internal memory 338 and transmits the video portion of the composite video file to the digital viewfinder 318 and the audio portion of the composite video file to the speakers 304. In alternative embodiments, the digital audio data received from the microphone 306 and the digital video data received from the digital video image sensor 314 may be stored separately in the internal memory 338.

The digital viewfinder 318 may be configured to display composite video files stored on the HHD 114. The digital viewfinder 318 may also be configured to display an image of the scene being captured while the corresponding composite video file is being recorded. The digital viewfinder 318 is preferably a liquid crystal display (LCD).

The interface buttons 320 may include mechanical buttons, such as a power button 322 and a record button 324. The power button 312 is configured to turn the HHD 114 on and off. The record button 324, when selected, begins and ends the recording of video and audio of a particular scene.

In an embodiment, the other interface buttons, including a left button 326, a right button 334, an increase button 320, a decrease button 336, a play/pause button 332, and a delete button 330 are implemented as capacitive-touch buttons. In alternative embodiments, these other interface buttons may be implemented as induction buttons, analog-resistive buttons, or any other technically feasible button type that can be engaged by the user in an electrically conductive manner. In alternative embodiments, any or all of the interface buttons may be implemented as a mechanical button. The left button 326 and the right button 334 may be used to scroll through composite video files stored in the internal memory 338 or to navigate menu options. The increase button 328 and the decrease button 336 provide various functions depending on the current operating mode of the HHD 114, including increasing/decreasing a magnification factor (e.g., a zoom factor), increasing/decreasing an audio volume, or incrementing/decrementing input values in various menu options such as date and/or time setup. For example, when the HHD 114 is in playback mode, the increase button 328 is used to increase the audio volume. In other modes, the increase button 328 is used to increase the magnification of an image being captured or viewed on the digital viewfinder 318.

Similarly, the decrease button 336 is used to decrease the audio volume in playback mode. In other modes, the decrease button 336 is used to decrease the magnification of an image being captured or viewed on the digital viewfinder 318. Similarly, the play/pause button 332 provides various functions depending on the current operating mode of the HHD 114, including playing a composite video file stored on the HHD 114, pausing the playback of a composite video file, and accepting a menu option, among others. The delete button 320, when selected, causes data to be deleted from the internal memory 338.

The internal memory 338 stores the composite video files as well as firmware that is executed by the CPU 316 to control the operations of the HHD 114. The internal memory 338 comprises either volatile memory, such as dynamic random access memory (DRAM), or non-volatile memory, such as a hard disk or a flash memory module, or a combination of both volatile and non-volatile memory. The internal memory 338 also stores a software driver 340 implemented as a set of program instructions configured to coordinate operation between the interface buttons 320 and the other components of the HHD 114, as described in greater detail herein. For example, the program instructions that constitute the driver 340 may be executed by the CPU 316 to cause different capacitive-touch buttons to be illuminated when the HHD 114 is in different operating modes.

The internal memory may also include a software application 342. When the HHD 114 is coupled to computing device via the data connector 302 or via another wired or wireless connection, the software application 342 is transferred to the computing device. In one embodiment, the software application 342 is automatically installed on the computing device once transferred from the HHD 114 to the computing device. In alternative embodiments, the software application 342 may be downloaded from the Internet and installed on the computing device. In one embodiment, the software application 342 may be configured to provide a user interface for a sender to share one or more media items with one or more recipients via a channel and/or provide a user interface for a recipient to receive multiple streams of media items via one or more channels and aggregate the multiple streams into a single user interface.

As persons having ordinary skill in the art would understand, the HHD 114 described in detail in FIG. 3 is merely one embodiment of a hand-held device, and many other configurations are within the scope of embodiments of the invention.

Embodiments of the invention provide a user interface for allowing users to share media items with other users. A user may create a "channel" using a software application and associate one or more media items with the channel. Media items may include videos, images, or any other type of media file. Each channel is also associated with one or more recipients. In one embodiment, recipients are identified by e-mail (electronic mail) address. In alternative embodiments, recipients are identified by a telephone number (e.g., a mobile telephone number).

When a sender creates a channel and associates one or more media items and one or more recipients with the channel, the media items are uploaded from the sender computing device 102 and stored on the server computing device 110 and/or the database 112 via the network 104. A notification may be sent to each of the one or more recipients indicating that the media items are being shared to the recipients. In one embodiment, the recipients are identified by e-mail address and the notification is sent to each recipient via e-mail. In other embodiments, where recipients are identified by email address or by another mechanism, the notifications may be sent via another medium, such as a social network feed or message (e.g., Facebook© feed, Twitter™ tweet), Really Simple Syndication (RSS) feed, text message, SMS (Short Message Service) message, among others. A recipient of the channel is then able to access the media items included in the channel created by the sender via a viewport. The viewport is a software application and/or interface implemented on the recipient's computing device. The viewport may have one or more different implementations, such as a web interface, a mobile phone application, a set-top box, web-enabled TV, and/or a desktop application installed and executing on a computer system. The viewport may also be incorporated into the software application that is used by a sender to share media items via channels. Accordingly, in some embodiments, a single software application may allow the user to manage the channels that the user has shared with others (i.e., user acting as "sender") and also manage the channels they the user has received (i.e., user acting as "recipient").

In some embodiments, the sender may add additional media items to an already-existing channel. When additional media items are added to the channel, these additional media items become available to each of the recipients of the channel. Similarly, the sender may cause one or more additional recipients to be associated with the channel. When one or more additional recipients are associated with the channel, the one or more additional recipients are also able to access each of the one or more media items included in the channel.

In yet further embodiments, the sender may create multiple channels. Each channel may be associated with one or more sets of recipients. The set of recipients associated with each channel may be different. Additionally, a particular recipient may be associated with multiple channels. In such a scenario, the recipient associated with multiple channels is able to access the media items in each of the multiple channels with which the recipient is associated. In still further embodiments, a channel may be created where the sender is the only recipient of the channel. Additional details of various embodiments of adding and/or removing channels and/or recipients are described in greater detail herein.

Figure 4:
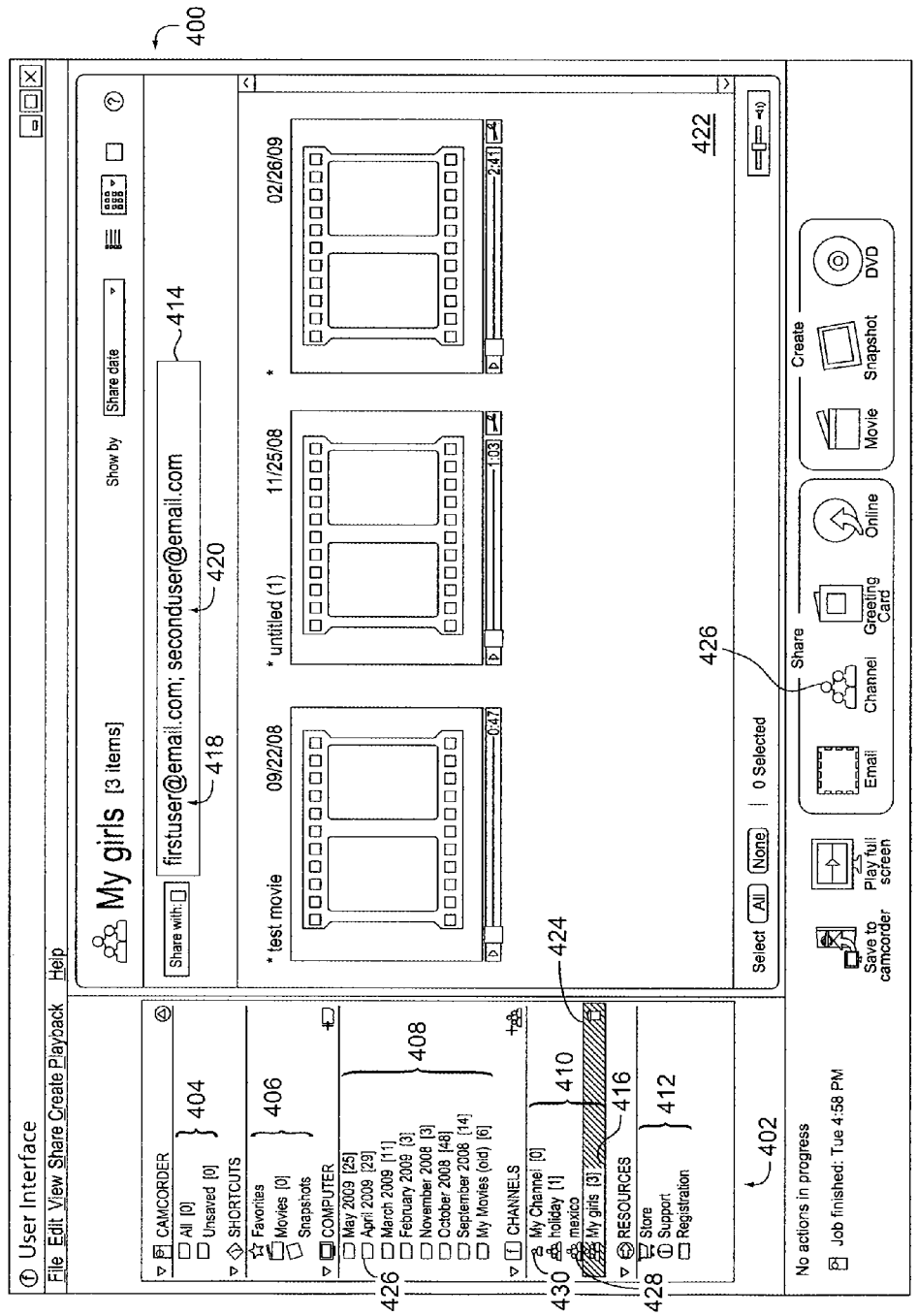
FIG. 4 is a screenshot of a user interface configured to allow a sender to share one or more media items with one or more recipients, according to one embodiment of the invention.

FIG. 4 is a screenshot of a user interface 400 configured to allow a sender to share one or more media items with one or more recipients, according to one embodiment of the invention. As shown, the user interface 400 includes a navigation portion 402 and a media portion 422. A software application stored in the memory 118 included in the sender computing device 102, and executed by the processor 116, may cause the user interface 400 to be displayed on a display device associated with the sender computing device 102. As described, the software application may have been transferred to the sender computing device 102 from a HHD 114, or, alternatively, may have been downloaded from the Internet. In still further embodiments, the software application may be stored on a remote server and be accessed over a web portal, or the like.

Navigation portion 402 includes one or more additional portions, including a hand-held device (HHD) portion 404, a shortcuts portion 406, a computer portion 408, a channels portion 410, and a resources portion 412. One or more of the portions 404, 406, 408, 410, 412 may include one or more buttons or links that may allow one or more media items to be displayed in the media portion 422 of the user interface 400. In one embodiment, visual representations displayed as "folder" icons 426 are displayed in the navigation portion 402 when the media items associated with that visual representation are stored locally within a memory associated with the sender computing device 102. The media items stored locally may have been captured by the HHD 114 and/or downloaded from the Internet and/or received from any source. In some embodiments, the visual representations are represented as "channel icons" 428 representing multiple people when the media items associated with that visual representation are remotely stored on a server or other computing device and one or more other recipients (i.e., other than the sender) can also access the media items. In yet further embodiments, the visual representation is represented as a "channel icon" representing a single person 430 when the media items associated with that visual representation are remotely stored on a server or other computing device and only the sender is able to access the media items associated with that visual representation.

The HHD portion 404 includes visual representations that allow a user to view media items stored in the memory 338 included in a HHD 114 or in another hand-held device associated with the sender computing device 102. A HHD 114 may be coupled to the sender computing device 102 via a wired and/or wireless communication. In some embodiments, the HHD 114 is enumerated as a mass storage device associated with the sender computing device 102. In one embodiment, when the HHD 114 is coupled to the sender computing device 102, all of the media items that have not yet been copied to the sender computing device are transferred to the local storage associated with the sender computing device.

In an alternative embodiment, the HHD 114 may provide a user interface that allows a user of the HHD 114 to "tag" media items stored in the internal memory 338 of the HHD 114 as designated for one or more particular channels before the HHD 114 is coupled to the sender computing device 102. Accordingly, when the HHD 114 is coupled to the sender computing device 102, transfer to the server 110 of those media items that are tagged as designated for one or more particular channels is automatically initiated. In one embodiment, the media items are transferred directly from the HHD 114 to the server 110. In another embodiment, the media items may be first transferred to the sender computing device 102 and subsequently transferred from the sender computing device 102 to the server 110.

The shortcuts portion 406 includes visual representations that allow the user to access one or more aggregated media items. For example, some or all of the media items accessible via the navigation portion 402 may be aggregated into collections of media items designated as "favorites," video media items, and photo media items. In one embodiment, a user may designate one or more videos to be "favorite" videos. When the user selects the favorites shortcut, a representation of some or all of the media items designated as favorites is displayed in the media window 422. When the "movies" shortcut is selected by the user, a representation of each of the media items designated as "movies" is displayed in the media portion 422. Similarly, when the "photos" shortcut is selected by the user, a representation of each of the media items designated as a "photos" is displayed in the media portion 422. As persons having ordinary skill in the art would understand, the media items accessible via the navigation portion 402 may be aggregated in many different shortcuts using appropriate filtering logic. For example, a "new" shortcut may provided such that when the new shortcut is selected by the user, a representation of each of the media items that the user has not yet viewed is displayed in the media portion 422.

The computer portion 408 of the navigation portion 402 includes one or more visual representations (e.g., folders) including media items. As shown, the folders in the computer portion 408 are organized by month and year. As persons having ordinary skill in the art would understand, the organization of the folders in the computer portion 408 may include any organizational structure, including subfolders. A number is displayed adjacent to each folder and includes a number indicating the number of media items included in the folder. Each of the media items included in the folder included in the computer portion 408 is stored locally in the memory 118 and/or other storage device and/or disk associated with the sender computing device 102 that is executing the software application that causes the user interface 400 to be displayed.

The channels portion 410 includes one or more visual representations (e.g., channel icons) associated with one or more channels created by the sender. As shown, the sender has created a "My girls" channel that includes three media items. The "My girls" channel is shown as being highlighted 424, indicating that the "My girls" channel is currently selected by the user. When the "My girls" channel is selected, representations of the three media items associated with the channel are displayed in the media portion 422. As also shown in FIG. 4, the media portion 422 includes a recipient portion 414. The recipient portion 414 includes one or more e-mail addresses associated with the "My girls" channel. As described above, each recipient associated with one of the e-mail addresses included in the recipient portion 414 is permitted to access the three media items associated with the channel via a viewport. In the example shown in FIG. 4, a first user, associated with the email address "firstuser@email.com," and a second user, associated with the email address "seconduser@email.com," are both recipients of the "My girls" channel. Thus, the first user and the second user are able to access the three media items associated with the "My girls" channel via a viewport, such as a web browser interface.

Referring again to the channels portion 410, the sender has also created a "holiday" channel with one media item, and a "mexico" channel with no media items. As should be understood by those having ordinary skill in the art, the sender may create any number of channels. Additionally, a "My Channel" channel is included in the channels portion 410. The "My Channel" channel is a channel configured so that the user/sender is the only recipient. When media items are included in the "My Channel" channel, the sender is able to access the media items via any appropriate viewport. Advantageously, the user/sender is able to access media items associated with the "My Channel" channel "on-the-go" (e.g., via a web or mobile based application), thereby increasing the portability of the media items stored on the user/sender's computer.

The resources portion 412 includes additional resources associated with the user interface 400, including, a shortcut to a store interface, a help/support shortcut, and a registration shortcut. As persons having ordinary skill in the art would understand, any number of other resources may also be included in the resources portion 412.

Figure 5:
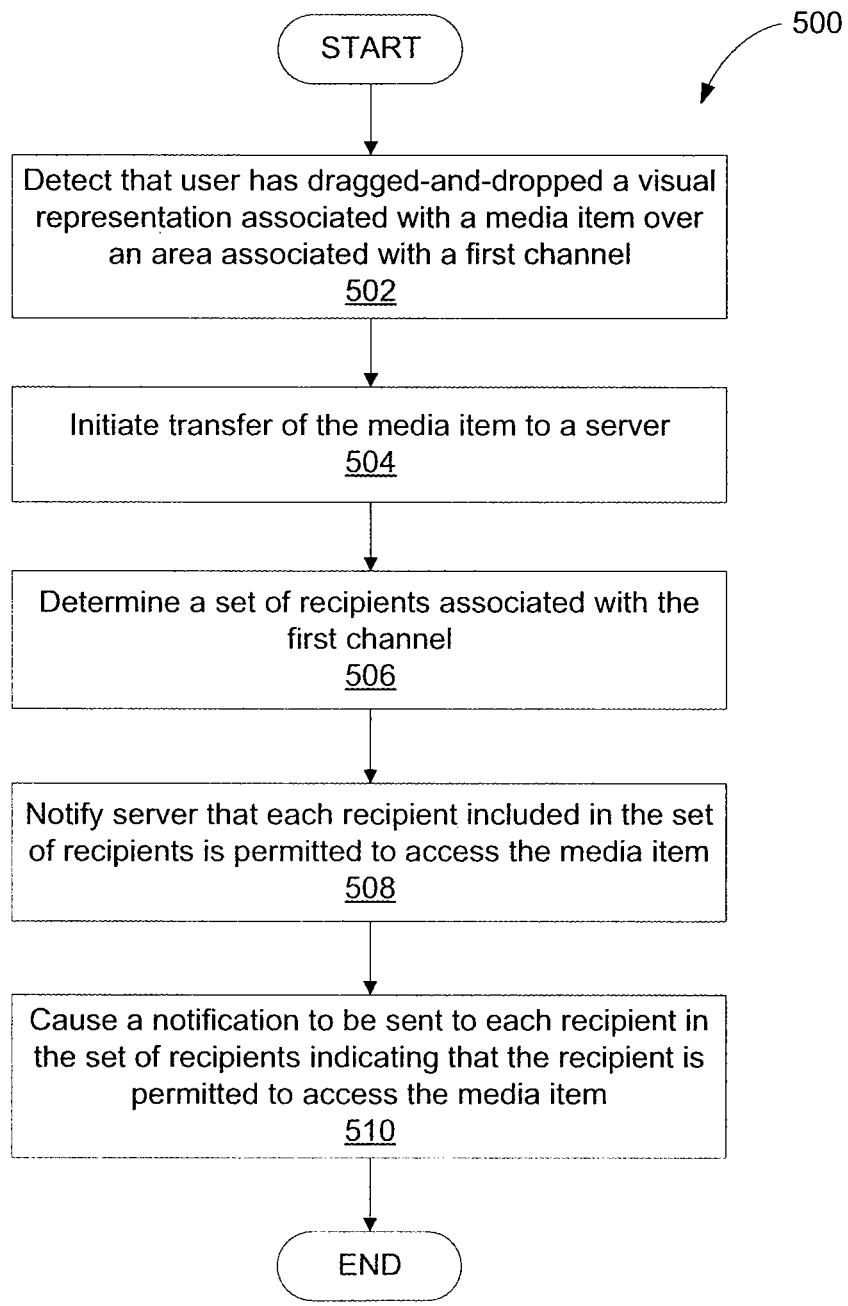
FIG. 5 is flow diagram of method steps for adding an additional video to a channel, according to one embodiment of the invention.

FIG. 5 is flow diagram of method steps for adding an additional video to a channel, according to one embodiment of the invention. Persons skilled in the art will understand that, even though the method 500 is described in conjunction with the systems of FIGS. 1-4, any system configured to perform the steps of the method 500 illustrated in FIG. 5, in any order, is within the scope of the invention.

As shown, the method 500 begins at step 502, where a software application executing on the sender computing device 102 detects that the sender has dragged and dropped a visual representation associated with a media item over an area associated with a first channel. In one embodiment, the visual representation associated with the media item is thumbnail image associated with the media item. For example, if the media item is a video clip, then the visual representation associated with the media item may be a single video frame associated with the video clip. In alternative embodiments, any other technically feasible representation may be provided other than a thumbnail image. As described in relation to FIG. 4, each channel associated with the sender is included in the channel portion 410. The visual representation of each channel included in the channel portion occupies a certain area of the user interface 400. Thus, at step 502, the software application detects that when the sender drags-and-drops a visual representation associated with a media item (e.g., a thumbnail of a media item) into an area associated with a channel. Before being dragged-and-dropped into the area associated with the channel, the media item associated with the thumbnail may be stored in a variety of locations. In one embodiment, the media item is stored on the sender computing device 102. In another embodiment, the media item may be stored on HHD 114 and dragged-and-dropped directly from the HHD 114 to the channel. In still further embodiments, the media item may be stored on a server, and a pointer to the media item is dragged-anddropped from one location into a channel. Additionally, in some embodiments, a sender may associate a media item with a particular channel by selecting a channel shortcut button 426 included in the user interface 400. For example, the user may select the media item (e.g., with a mouse cursor), and may then select the channel shortcut button 426. A dialog box may open requesting the user to select one or more channel to which the selected media item should be added. Additionally, the dialog box may allow the user to select one or more existing channels or create one or more additional channels with which the media item is to be associated. Additionally, in some embodiments, step 502 is omitted, and the software application detects that the user has associated a media item with the first channel in any technically feasible manner.

At step 504, the software application initiates a transfer of the media item associated with the visual representation from the sender computing device 102 to the server 110 via the network 104.

Figure 6:
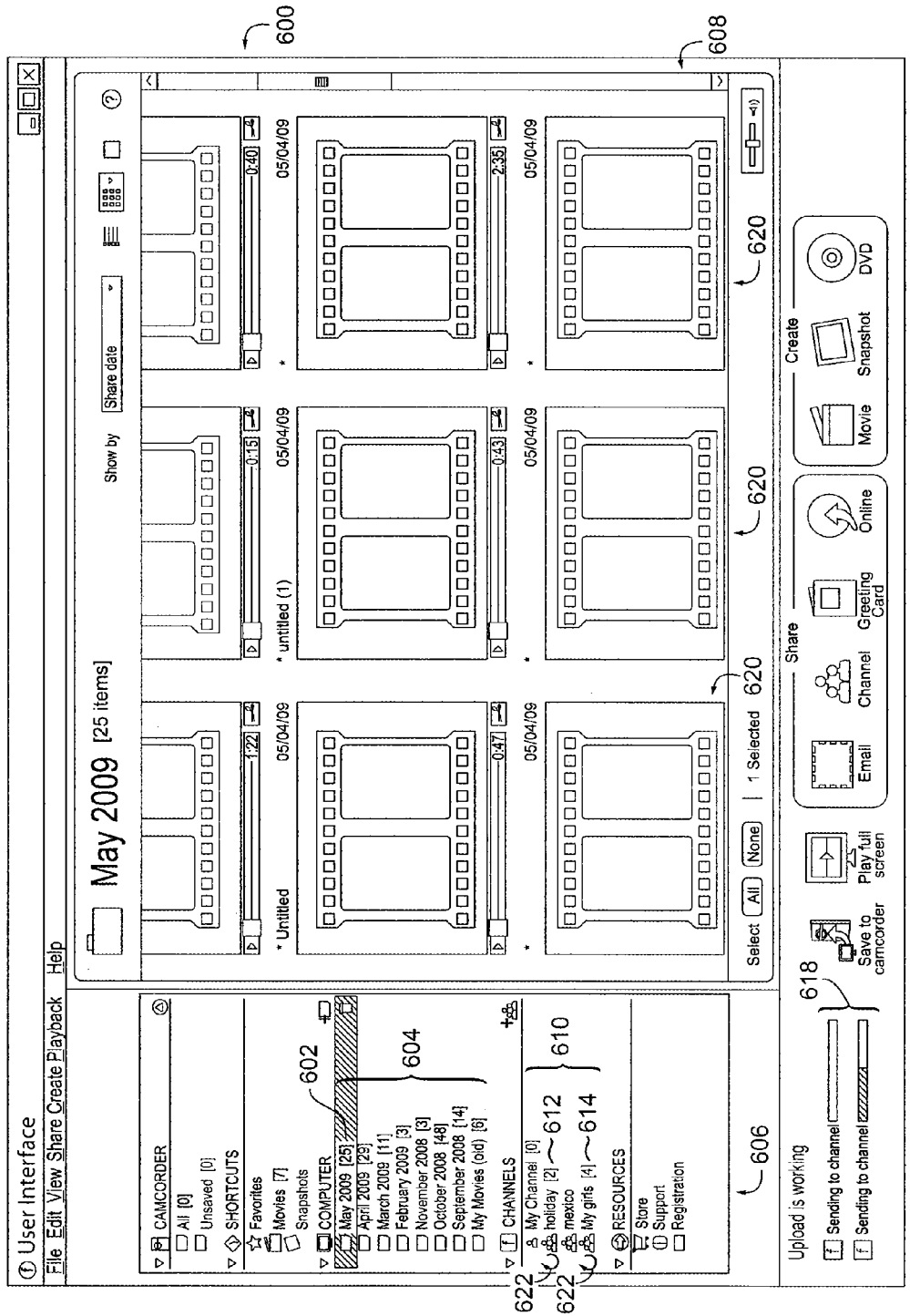
FIG. 6 is a screenshot of a user interface illustrating one or more media items being transferred to the server, according to one embodiment of the invention.

FIG. 6 is a screenshot of a user interface 600 illustrating one or more media items being transferred to the server 110, according to one embodiment of the invention. As shown, the user interface 600 includes a navigation portion 606 and a media portion 608. The navigation portion 606 includes a computer portion 604 and a channels portion 610.

A folder 602 included in the computer portion 604 is selected by the sender, as indicated by highlighting. As described above in FIG. 4, the media items included in a folder (i.e., folder 602) included in the computer portion 408 may be stored locally on the sender computing device 102. Once the folder 602 is selected, as shown in FIG. 6, thumbnail representations 620 of the media items associated with the folder 602 are displayed in the media portion 608 of the user interface 600.

In one embodiment, the sender manipulates a pointing device, such as a mouse, to select one of the media items included in the media window 608. The sender may then drag the thumbnail representation associated with the media item into one or more channels included in the channels portion 610. In the screenshot shown in FIG. 6, the sender has dragged-and-dropped a first media item into channel 612 and has dragged-and-dropped a second media item into channel 614. An icon 622 may be displayed adjacent to the visual representation of the channels 612, 614 indicating that one or more media items are currently being added to that particular channel. Additionally, a status portion 618 may also be included in the user interlace 600, which indicates that the transfer of media items to the server 110 is taking place.

Referring back now to FIG. 5, in some embodiments, where a copy of the media item is already stored on the server, the software application may be configured to omit step 504. Storing a duplicate copy of the media item on the server, in some embodiments, may be inefficient and wasteful. Thus, the software application may be configured to detect whether a copy of the media item has already been stored on the server before initiating a transfer of the media item. Thus, a duplicate copy of the media item is not transmitted to the server.

At step 506, the software application determines a set of recipients associated with the first channel. As shown in FIG. 4, a "My girls" channel 416 is associated with the first user associated with the first e-mail address 418 and a second user associated with the second e-mail address 420. At step 508, the software application notifies the server 110 that each recipient included in the set of recipients is permitted to access the media item that has been dragged-and-dropped into the area associated with the first channel. At step 510, the software application causes a notification to be sent to each recipient included in the set of recipients indicating that the recipient is permitted to access the media item. As described, the notification may be sent by the server as an e-mail, a social network feed notification, an RSS notification, a text message, or any other technically feasible type of notification. In some embodiments, the notification may also include a link to access one or more media items associated with the notification.

As described in greater detail herein, embodiments of the invention allow the sender to dynamically change the media items associated with a particular channel and/or the recipients associated with the particular channel.

In some embodiments, a sender may "crop" a video clip at different places along the video clip and store each of the different versions as separate media items in the same channel, or replace the original clip with the cropped video. In yet further embodiments, a sender may give a different name and/or title to a media that is otherwise a copy of another media item and store the two media items as different media items in the same channel.

In still further embodiments of the invention, a recipient of a particular channel has no knowledge of who are the other recipients of the same channel. In yet further embodiments, a forum and/or message board and/or comments section may be provided in the software application, whereby recipients and senders can communicate personal thoughts and/or messages between one another. In alternative embodiments, messages may be available to be viewed by any of the recipients and/or the sender of a particular channel.

In still further embodiments, the software application may be configured to allow different "skins" or formatting choices for different channels. For example, for a "Halloween" channel, the sender may choose a spooky skin with ghosts and goblins that is representative of a Halloween scene. In still further embodiments, the sender may "tell a story" to recipients by associating a channel with a series of media items and a message. Recipients can then view the entire "story" in some form in the viewport. In yet further embodiments, a channel may be embedded in a social networking website so that recipients of the channel can access the media items included in the channel via the social networking website.

Additionally, embodiments of the invention provide an easy-to-use user interface that dynamically updates the videos that are accessible by a particular recipient based on the selections made by the sender. The user interface described in FIGS. 4 and 6, in combination with the method 500, provides the advantage of allowing a sender to easily share media items with other users, overcoming the shortcomings of prior art approaches.

Figure 7:
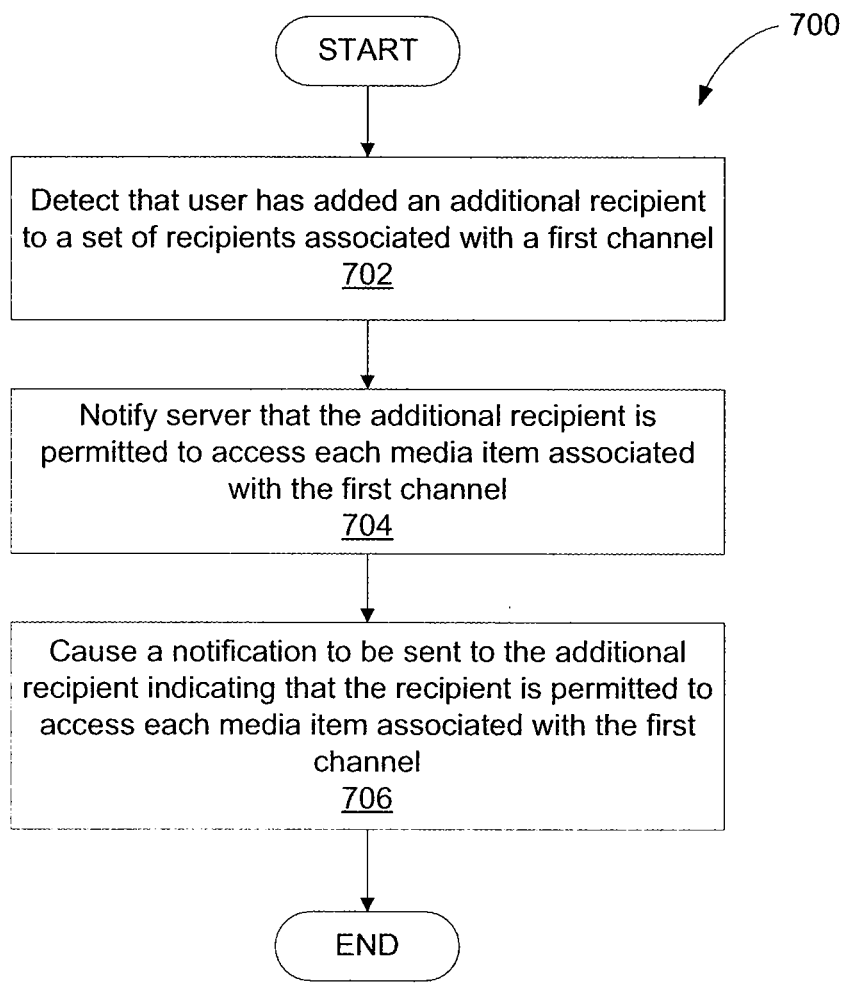
FIG. 7 is flow diagram of method steps for adding an additional recipient to a channel, according to one embodiment of the invention.

FIG. 7 is flow diagram of method steps for adding an additional recipient to a channel, according to one embodiment of the invention. Persons skilled in the art will understand that, even though the method 700 is described in conjunction with the systems of FIGS. 1-4 and 6, any system configured to perform the steps of the method 700 illustrated in FIG. 7, in any order, is within the scope of the invention.

As shown, the method 700 begins at step 702, where the software application executing on the sender computing device 102 detects that the sender has added an additional recipient to a set of recipients associated with a first channel. As described in FIG. 4, recipients may be identified by e-mail address. Accordingly, when the sender decides to add an additional recipient to have access to the media items associated with a particular channel, the sender may add an e-mail address associated with the additional recipient to the recipient portion 414 included in the media window 422 in the user interface 400.

At step 704, the software application notifies the server 110 that the additional recipient is permitted to access each media item associated with the first channel. For example, if the first channel is associated with three media items, then the software application notifies the server 110 that the additional recipient is permitted to access each of the three media items associated with the first channel. The server 110 may then modify the permissions associated with the media items stored in the database 112 to allow the additional recipient to have access to each of the media items associated with the first channel. At step 706, the software application causes a notification to be sent to the additional recipient indicating that the additional recipient is permitted to access each media items associated with the first channel. In one embodiment, the one or more media items associated with the channel are not uploaded again to the server 110 when the sender adds an additional recipient to the first channel.

In some embodiments, a sender can also remove recipients from a channel, thereby revoking access to the items associated with the channel. In further embodiments, senders can specify "sender permissions" that allow recipients to view and download items shared via the channel and/or allow recipients to re-share items privately and/or publicly.

Figure 8:
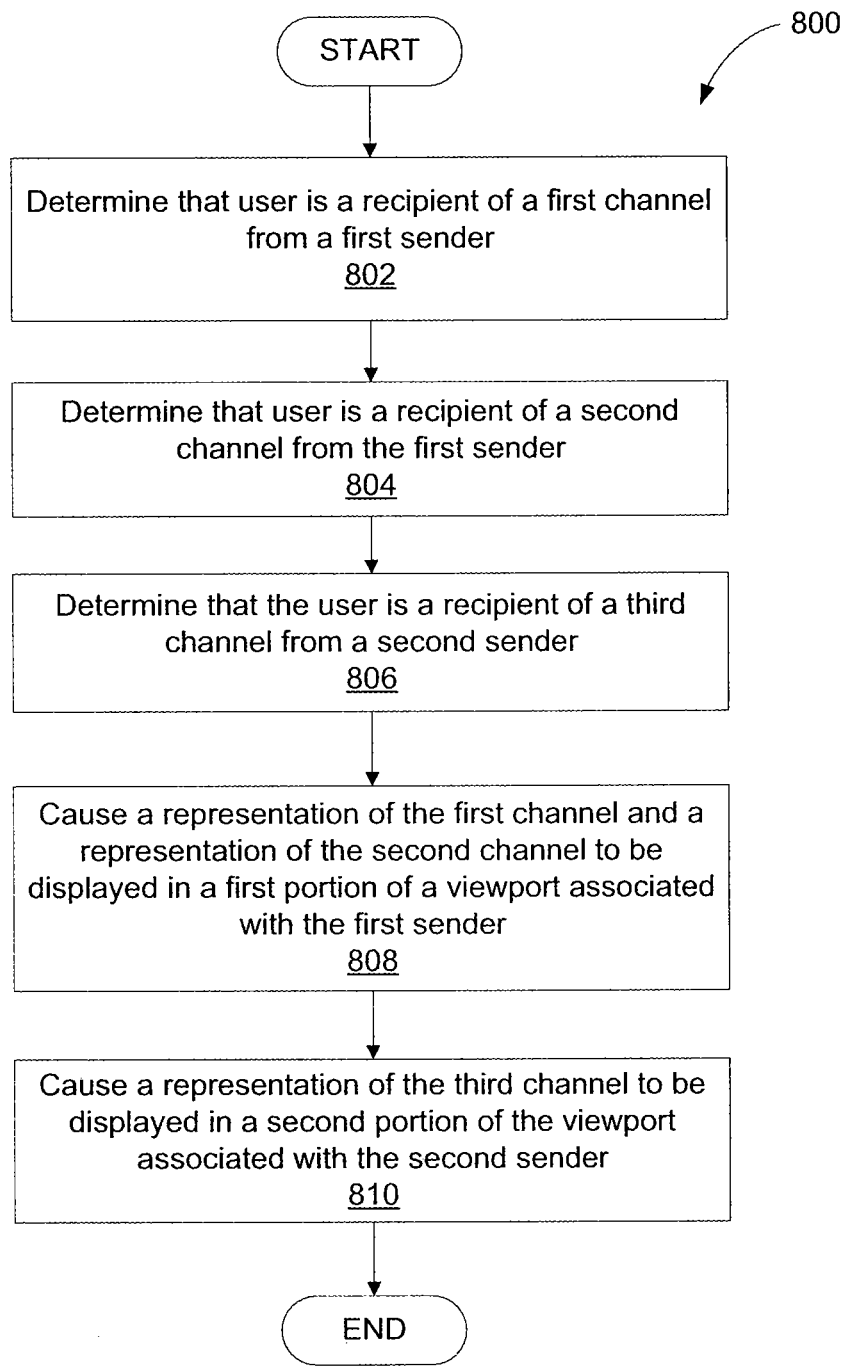
FIG. 8 is flow diagram of method steps for causing one or more channels to be displayed to a recipient in a viewport, according to one embodiment of the invention.

FIG. 8 is flow diagram of method steps for causing one or more channels to be displayed to a recipient in a viewport, according to one embodiment of the invention. Persons skilled in the art will understand that, even though the method 800 is described in conjunction with the systems of FIGS. 1-4 and 6, any system configured to perform the steps of the method 800 illustrated in FIG. 8, in any order, is within the scope of the invention.

The viewport may be implemented in one or more various platforms including a web interface, a mobile phone application, a set-top box, a web-enabled TV, and/or a desktop application executing on a recipient computing device 106, 108. In some embodiments, the viewport is embodied by a software application executing on a recipient computing device 106, 108.

As shown, the method 800 begins at step 802, where a viewport application determines that the user is a recipient of a first channel from the first sender. Referring to the example shown in FIG. 4, the first user (e.g., the recipient) is associated with the first e-mail address 418. The first sender has created a first channel (e.g., "My girls" channel) and has added the first user as a recipient of the first channel.

At step 804, the viewport application determines that the user is a recipient of a second channel from the first sender. For example, sender may include the user as a recipient of two different channels. At step 806, the viewport application determines that the user is a recipient of a third channel from a second sender. In one embodiment, the viewport application may limit the channels, and/or corresponding media items, that the recipient may access via the viewport. For example, if the viewport application is activated by selecting a link included in an e-mail notification received by the recipient, then the viewport application may allow the recipient to access only the media items associated with the notification, and deny access to other media items. The other media items may still appear in the viewport as greyed-out or stricken-through, indicating that the recipient cannot access that content at the present time. In one embodiment, the other media items displayed in the viewport but not accessible by the recipient may include all or some of the media items shared with the recipient via the same e-mail address as the e-mail address at which the recipient received the e-mail notification. In some embodiments, if the recipient is logged-in, or subsequently logs-in, to a personal media sharing account, then all of the media items available to the recipient are able to be accessed via the viewport application and no media items are denied access. In further embodiments, the personal media sharing account of the recipient may be associated with multiple email addresses. All or a portion of the media items shared with the recipient via one or more of the multiple email addresses may be aggregated into the viewport application and accessible by the recipient simultaneously.

Figure 9:
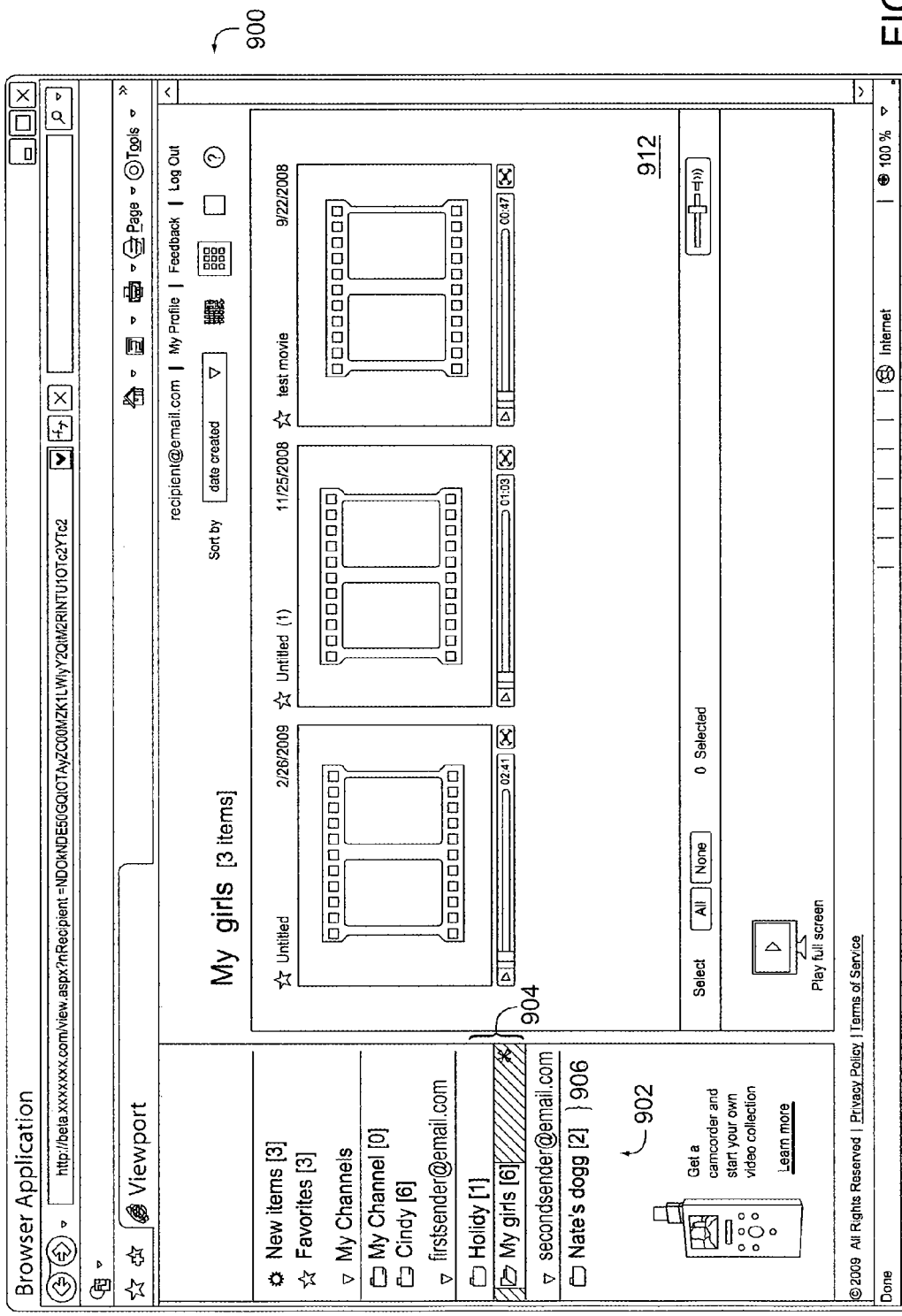
FIG. 9 is a screenshot of a viewport, according to one embodiment of the invention.

At step 808, the viewport application causes a representation of the first channel and a representation of the second channel to be displayed in a first portion of the viewport associated with the first sender. FIG. 9 is a screenshot of a viewport 900, according to one embodiment of the invention. In the embodiment shown in FIG. 9, the viewport 900 is implemented as a web interface.

As shown, the viewport 900 includes a navigation portion 902 and a media portion 912. The navigation portion includes a first portion 904 and a second portion 906. As described in step 808, a representation of the first channel (e.g., "Holiday" channel) and a representation of the second channel (e.g., "My girls" channel) are displayed in the first portion 908. Both the first channel and the second channel are being shared from the same sender (e.g., first sender).

Referring back now to FIG. 8, at step 810, the viewport application causes a representation of the third channel to be displayed in a second portion of the viewport associated with the second sender. As shown in FIG. 9, the "Nate's dogg" channel associated with the second sender is displayed in the second portion 906.

In an alternative embodiment, a representation of each channel that the recipient has created may be displayed in a third area of the viewport 900. In still further embodiments, a "New items" representation may be displayed that, when selected by the recipient, causes a thumbnail representation of each of the media items not yet viewed to be displayed in the media portion 912. In some embodiments, when a recipient views a media item via a first viewport (e.g., a web browser), and subsequently launches a second viewport via a different platform (e.g., a mobile phone application and/or web-enabled TV and/or set-top box), then the media item viewed in the first viewport is no longer indicated as being "not viewed." In some embodiments, "new items" are aggregated across all channels associated with the viewport, including both local folders containing local media items and remote "channels." In other embodiments, "new items" are aggregated access a subset of the local and/or remote channels.

In still further embodiments, the viewport application may provide a search feature where a recipient may search all or a portion of the local and/or remote media files using one or more search criteria.

In one embodiment, a recipient of a particular channel does not know who the other recipients are of the channel. In an alternative embodiment, the recipient can determine who are each of or a portion of the other recipients of the channel.

Figure 10:
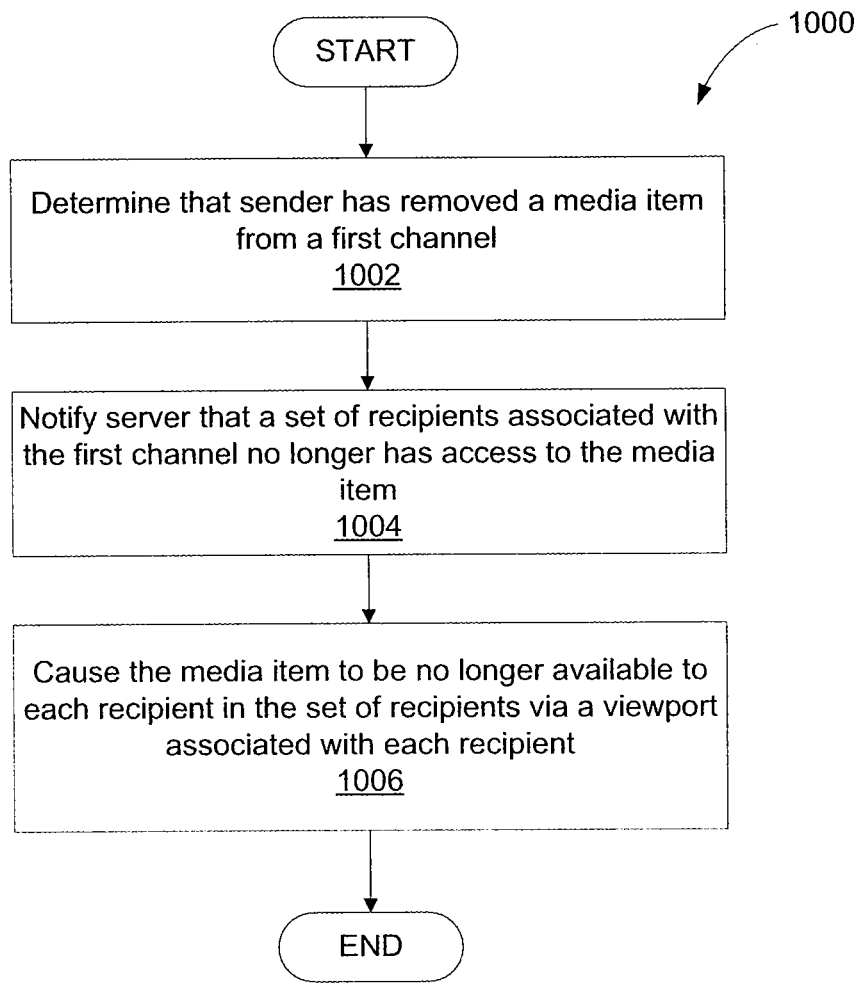
FIG. 10 is flow diagram of method steps for removing a media item from a channel, according to one embodiment of the invention.

FIG. 10 is flow diagram of method steps for removing a media item from a channel, according to one embodiment of the invention. Persons skilled in the art will understand that, even though the method 1000 is described in conjunction with the systems of FIGS. 1-4, 6, and 9, any system configured to perform the steps of the method 1000 illustrated in FIG. 10, in any order, is within the scope of the invention.

As shown, the method 1000 begins at step 1002, where the software application determines that the sender has removed a media item from a first channel. Various techniques may be used to remove a media item from the first channel. Referring to FIG. 4, the sender may select the media item from the media portion 422 of the user interface 400. Again, the media portion 422 displays one or more visual representations (e.g., thumbnails) associated with one or more media files associated with the selected channel 416. In one embodiment, the sender may then choose to click on a delete button included in the user interface (not shown) to delete the media item from the channel. In an alternative embodiment, the sender may press a delete button on a keyboard associated with the computer system to delete the media item from the channel. In some embodiments, a confirmation window may be displayed requesting the sender to confirm the decision to remove to the media item from the first channel. In some embodiments, media items shared via a channel may expire so that recipients can no longer access expired media items. For example, an icon may be displayed in the viewport indicating to a recipient whether a media item is expired or will soon expire.

Referring back now to FIG. 10, at step 1004, the software application notifies the server 110 that a set of recipients associated with the first channel is no longer permitted to access the media item. The server 110 may then update the associations and/or permissions associated with the media item so that the recipients included in the set of recipients are no longer permitted to access the media item. In some embodiments, the media item is not removed from the server 110 since the media item may be associated with a different channel other than the first channel. In some embodiments, where the video is not associated with any other channels besides the first channel, then the media item may be removed from the server 110. Additionally, if a particular recipient included in the set of recipients is also included in a different set of recipients associated with a different channel in with which the same media item is associated, then that particular recipient is still able to access the media item via the different channel.

At step 1006, the software application causes the media item to be no longer available to each recipient in the set of recipients via a viewport application associated with the recipient. As described in FIG. 9, the viewport 900 includes a media portion 912 that displays a thumbnail of media items included in a selected channel/folder. Once the sender has removed a media item from a particular channel (i.e., step 1002) and the server is notified (i.e., step 1004), then the media item is no longer available in the viewport 900 of the recipient.

In one embodiment, when a recipient is permitted to "access" the media item via a viewport, the recipient is only permitted to play back or view the media item from the server 110 via the network 104, and is not permitted to download the media item to the local storage associated with recipient computing device 106, 108. In alternative embodiments, the recipient is permitted to download the media item associated with the channel to the recipient computing device 106, 108. In still further embodiments, once a media item is downloaded to the recipient computing device 106, 108, the recipient may then share the media item with other recipients via a channel created by the recipient, whereby the recipient acts a "sender." In still further embodiments where the recipient is able to download the media item, the recipient may be prohibited from editing the media item.

It still further embodiments, once a media item is shared with a recipient, the recipient may share the media item with other recipients without downloading the media item to the recipient computing device 106, 108. For example, an original sender shares a first media item with a first recipient via a first channel managed by the original sender. The first recipient then shares the first media item with a second recipient via a second channel managed by the first recipient. The first recipient is, thus, acting as a "second sender." Additionally, in some embodiments, the first recipient acting as a second sender may share the media items included in the channel via a social networking website. In one embodiment, if the original sender removes the first media item from the first channel, then the media item is also automatically removed from the second channel. Accordingly, the original sender may maintain control of the first media item, even when shared via a "second sender." Additionally, in some embodiments, this feature may cascade down through not only one second sender, but many recipients forwarding the media items. For example, user A shares with user B, then user B shares with user C, then user C shares with user D, and so forth. If user A revokes access to the media item, then each of users B, C, and D is denied access to the media item thereafter.

The steps described in FIG. 10 apply not only to removing a media item from a channel, but also to modifying a media item associated with a channel. For example, a sender may modify a first media item included a first channel to have different characteristics, such as a different frame rate or a different name/title. Alternatively, the sender may crop a portion from the beginning, end, and/or middle of the media item to create the modified media item. The modified media item is then transferred to the server 110 and/or the media files stored on the server 110 are updated to reflect the changes. Once the server has received the modified media item, a notification may be sent to each recipient in the set of recipients associated with the first channel. Additionally, from the recipient's perspective, the viewport may only allow the recipient to access the modified media item, and may remove the original media item from the list of available media items that the recipient is permitted to access.

Figure 11:
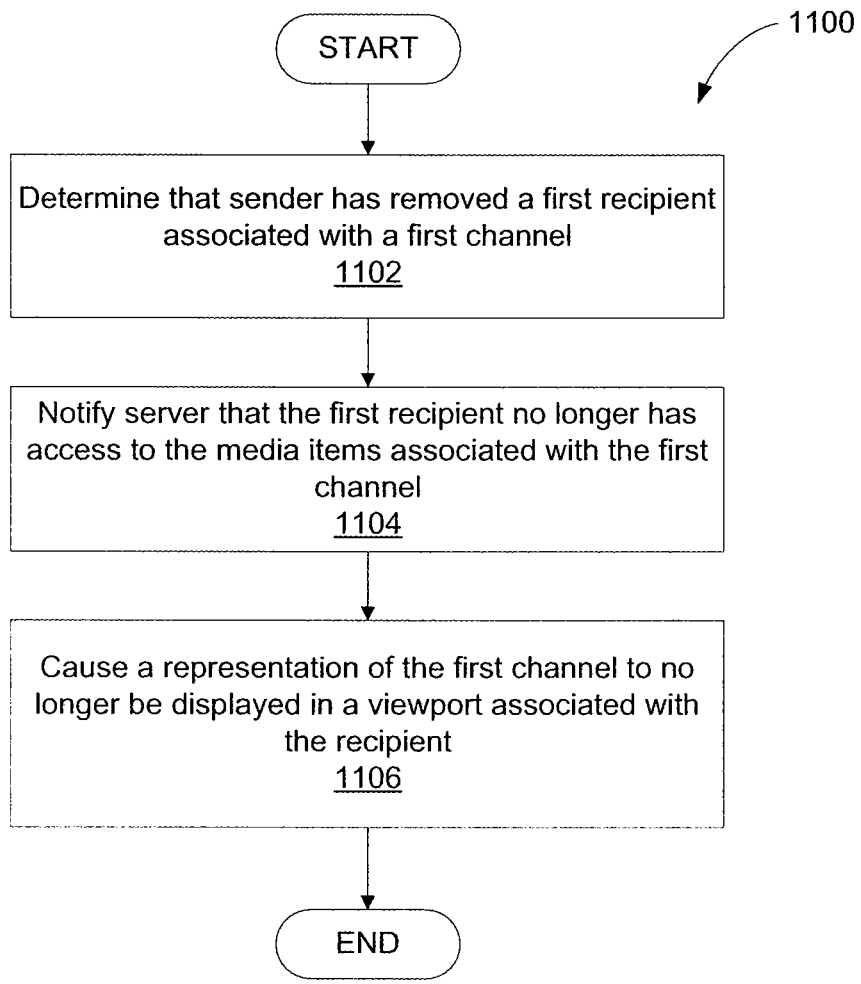
FIG. 11 is flow diagram of method steps for removing a recipient from a channel, according to one embodiment of the invention.

FIG. 11 is flow diagram of method steps for removing a recipient from a channel, according to one embodiment of the invention. Persons skilled in the art will understand that, even though the method 1100 is described in conjunction with the systems of FIGS. 1-4, 6, and 9, any system configured to perform the steps of the method 1100 illustrated in FIG. 11, in any order, is within the scope of the invention.

As shown, the method 1100 begins at step 1102, where the software application determines that the sender has removed a first recipient associated with a first channel. Referring back to FIG. 4, the first recipient, associated with the first e-mail address 418, and the second recipient, associated with the second e-mail address 420, are included in the recipient portion 414 and are associated with the "My girls" channel. As an example, the sender may remove the first recipient from the channel by deleting the first e-mail address from the recipient listing 414.

At step 1104, the software application notifies the server 110 that the recipient no longer has access to the media items associated with the first channel. Referring again to FIG. 4, the "My girls" channel 416 is associated with three media items. When the first recipient is removed from the "My girls" channel 416, the first recipient would no longer have access to the three media items included in the "My girls" channel 416.

Referring again to FIG. 11, at step 1106, the software application causes a representation of the first channel to no longer be displayed in a viewport associated with the first recipient. Continuing with the above example, if the first recipient launches the viewport subsequent to the sender removing the first recipient from the recipient listing associated with the first channel, then the first recipient would no longer be permitted to access any of the media items associated with the first channel. In an alternative embodiment, the media items that the recipient is permitted to access may be updated in an already-open viewport. For example, the viewport application may be capable of removing a media item (or adding an additional media item) to a media portion of the viewport when the sender removes a media item (or adds a media item) to the channel, all while the viewport remains open and is not re-started. In alternative embodiments, the viewport may need to be refreshed before the updates are reflected in the viewport.

Figure 12:
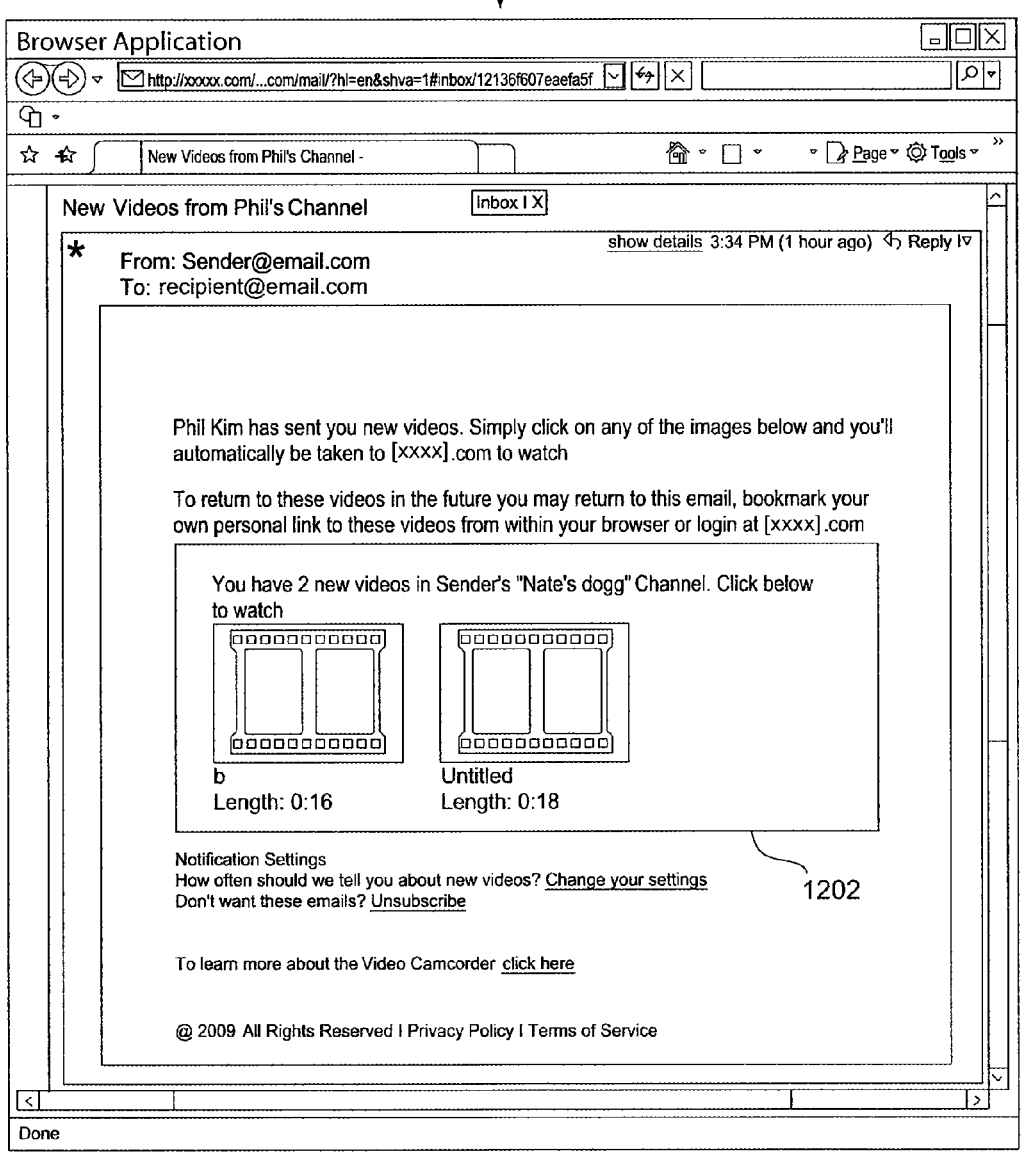
FIG. 12 is a screenshot of an e-mail notification received by a recipient, according to one embodiment of the invention.

FIG. 12 is a screenshot of an e-mail notification received by a recipient, according to one embodiment of the invention. As shown, the email notification includes a link 1202. The link 1202 is associated with two media items that the sender has shared with the recipient via the "Nate's dogg" channel. In one embodiment, if the recipient clicks on the link 1202 included in the e-mail notification, then a web browser associated with the recipient computing device is navigated to a webpage associated with the viewport.

Figure 13:
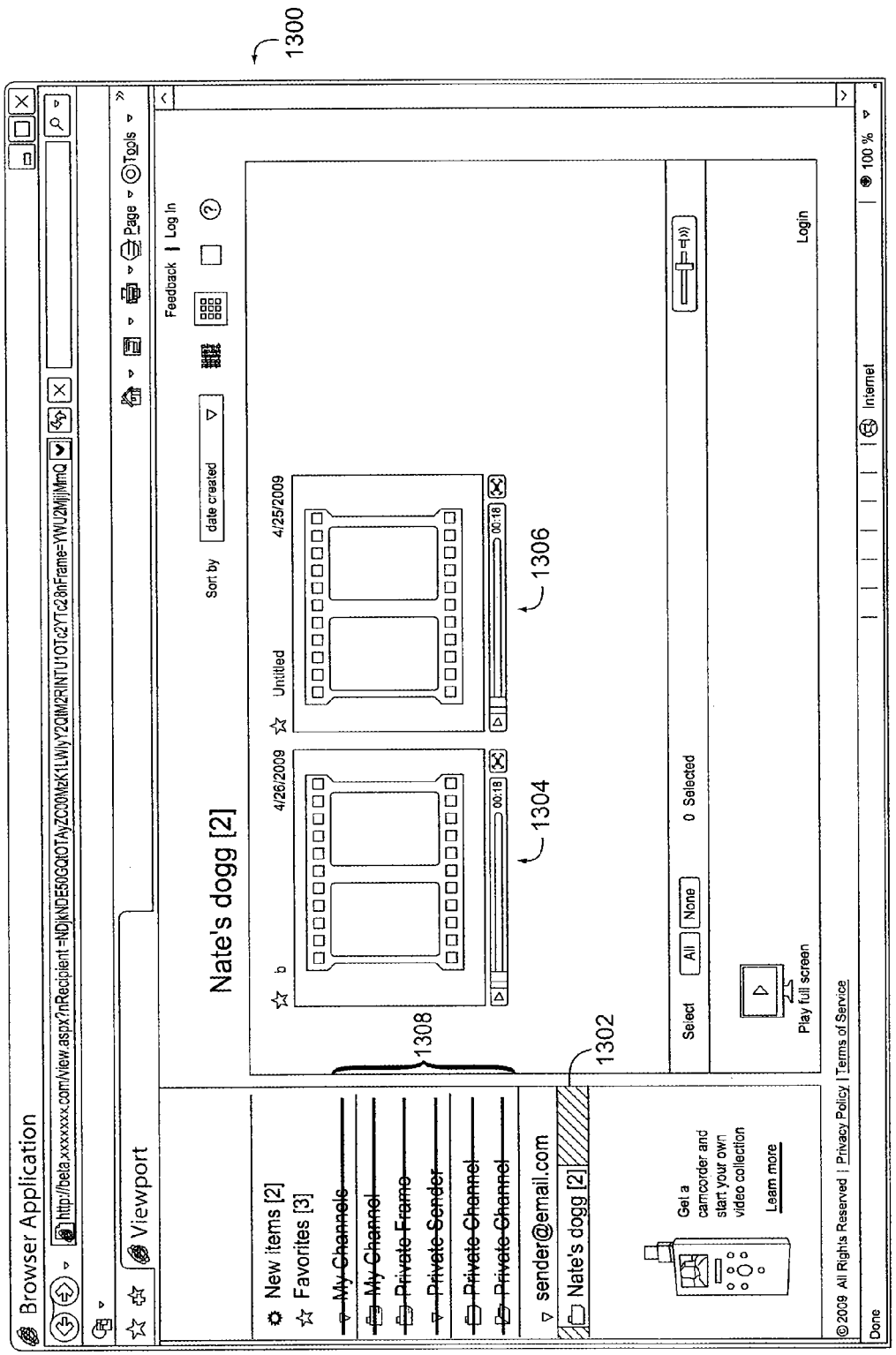
FIG. 13 is a screenshot of a viewport to which a web browser of a recipient is navigated when the recipient clicks on a link included in the e-mail notification, according to one embodiment of the invention.

FIG. 13 is a screenshot of a viewport 1300 to which the web browser of the recipient is navigated when the recipient clicks on the link 1302 included in the e-mail notification, according to one embodiment of the invention. As shown, the "Nate's dogg" channel 1302 is selected and the recipient is permitted to access the media items 1304, 1306. However, since the recipient has not logged-in to a personal media sharing account, the recipient is not able to access other channels 1308 associated with the same recipient e-mail address as the e-mail address at which the e-mail notification was received by the recipient. In one embodiment, the other channels 1308 may appear grayed-out in or with a strike-through to indicate that the recipient is not currently permitted to access the other channels 1308. These other channels 1408 are presently disabled and the recipient is not permitted to access the media items associated with the other channels 1308.

Advantageously, the user does not have to create a personal account to be able to access personalized media items shared with him/her from another (i.e., the media items associated with the link 1202). In sum, a recipient is able to access personalized media items without a user account or password, which is a unique aspect of embodiments of the invention.

Figure 14:
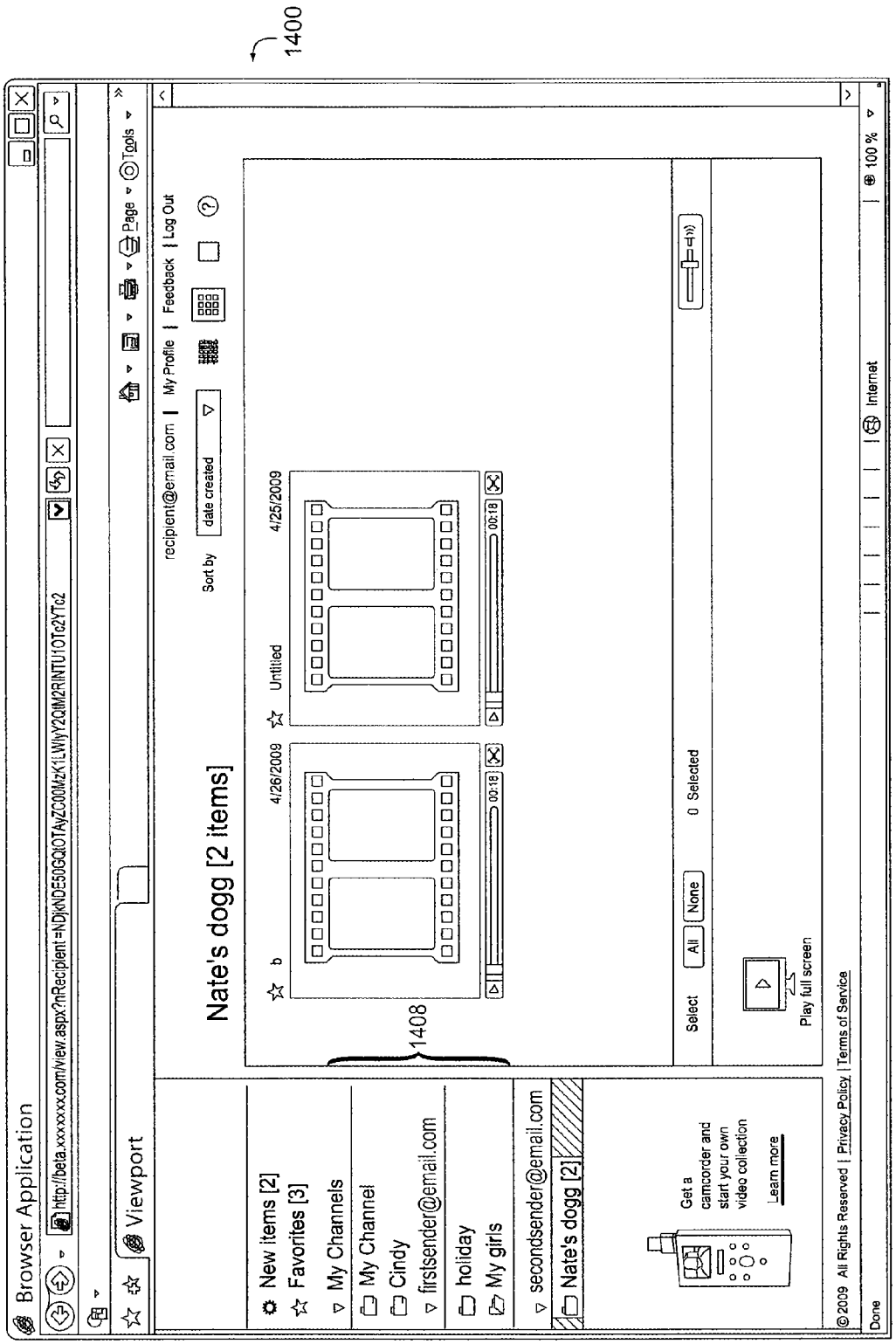
FIG. 14 is a screenshot of a viewport after the recipient has logged-in to a media sharing account, according to one embodiment of the invention.

FIG. 14 is a screenshot of a viewport 1400 after the recipient has logged-in to a media sharing account, according to one embodiment of the invention. As shown, the other channels 1408 no longer appear as grayed-out and/or with a strike-through. Thus, the recipient is now permitted to access the media items associated with these other channels 1408. If the user does not have a personal account created, a link may be provided to allow the user create a personal media sharing account.

In one embodiment, the personal media sharing account may define an "identity" of the user using multiple email addresses. As is known, many individuals maintain multiple email addresses for different purposes, e.g., a personal email address and a work email address. In some embodiments, an account profile associated with the personal media sharing account may allow the user to enter multiple email address that the user maintains. Once an email address is verified (e.g., by sending a verification email to the email address and requesting the user to respond), the email address is associated with an "identity" of the user. Accordingly, whenever a sender adds any of the email addresses associated with the user as a recipient of the channel, all of the channels are aggregated into a single viewport that includes channels shared to various email addresses associated with the user. Additionally, in another embodiment, where a sender has included two different email addresses associated with the same identity as recipients of the same channel, the viewport application may be configured to detect this occurrence and only display one copy of the channel in the viewport of the recipient.

Figure 15:
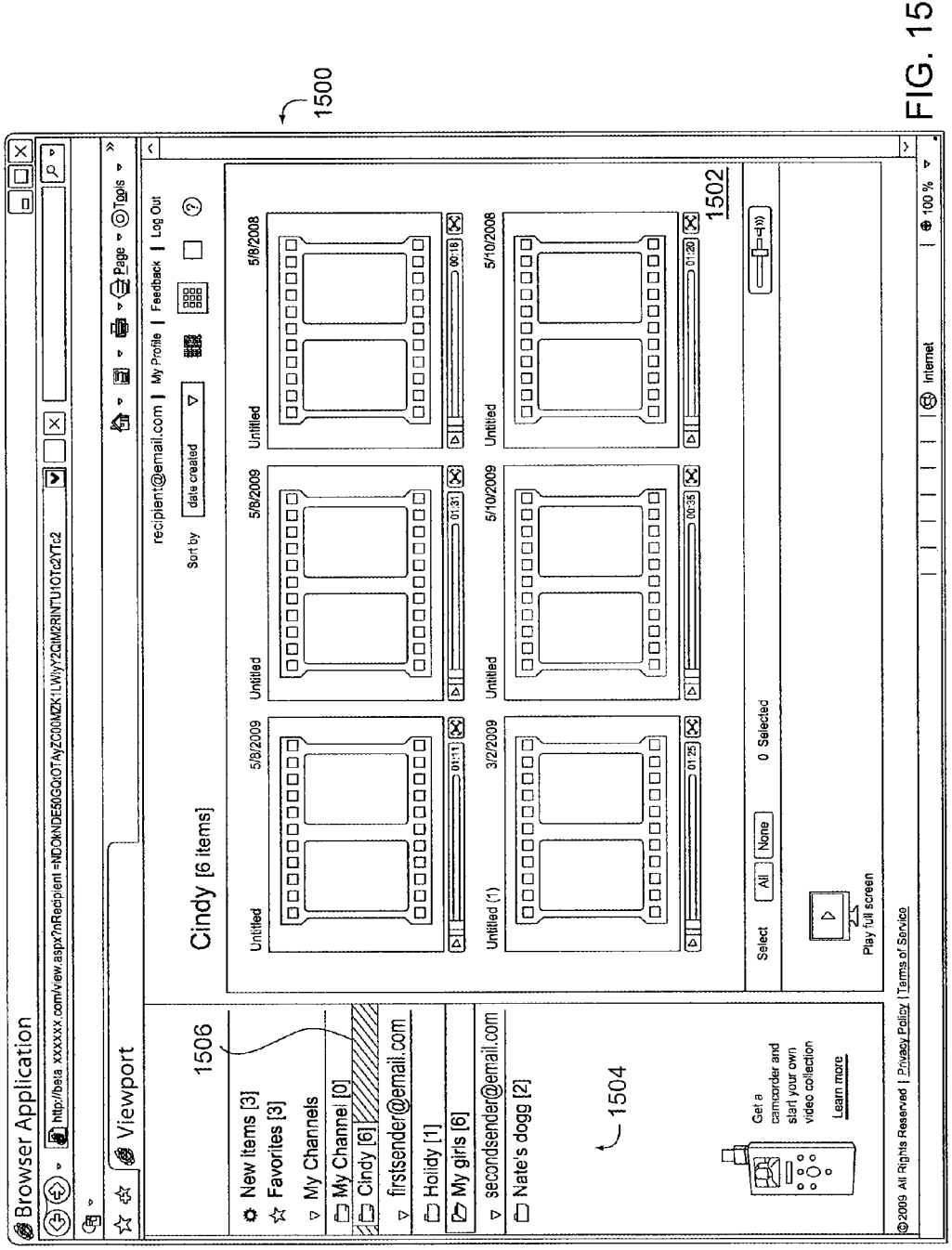
FIG. 15 is a screenshot of a viewport configured to display media items associated with a channel created by the recipient, according to one embodiment of the invention.

FIG. 15 is a screenshot of a viewport 1500 configured to display media items associated with a channel created by the recipient, according to one embodiment of the invention. As shown, the viewport includes a media portion 1502 and a navigation portion 1504. In the navigation portion 1504, a "Cindy" channel 1506 is selected by the recipient. The "Cindy" channel 1506 is included in a "My channels" portion of the navigation portion. Channels included in the "My channels" portion include those channels created by the recipient (i.e., recipient acts as a "sender") and also includes the "My Channel" channel to which the recipient is the only "recipient."

Figure 16:
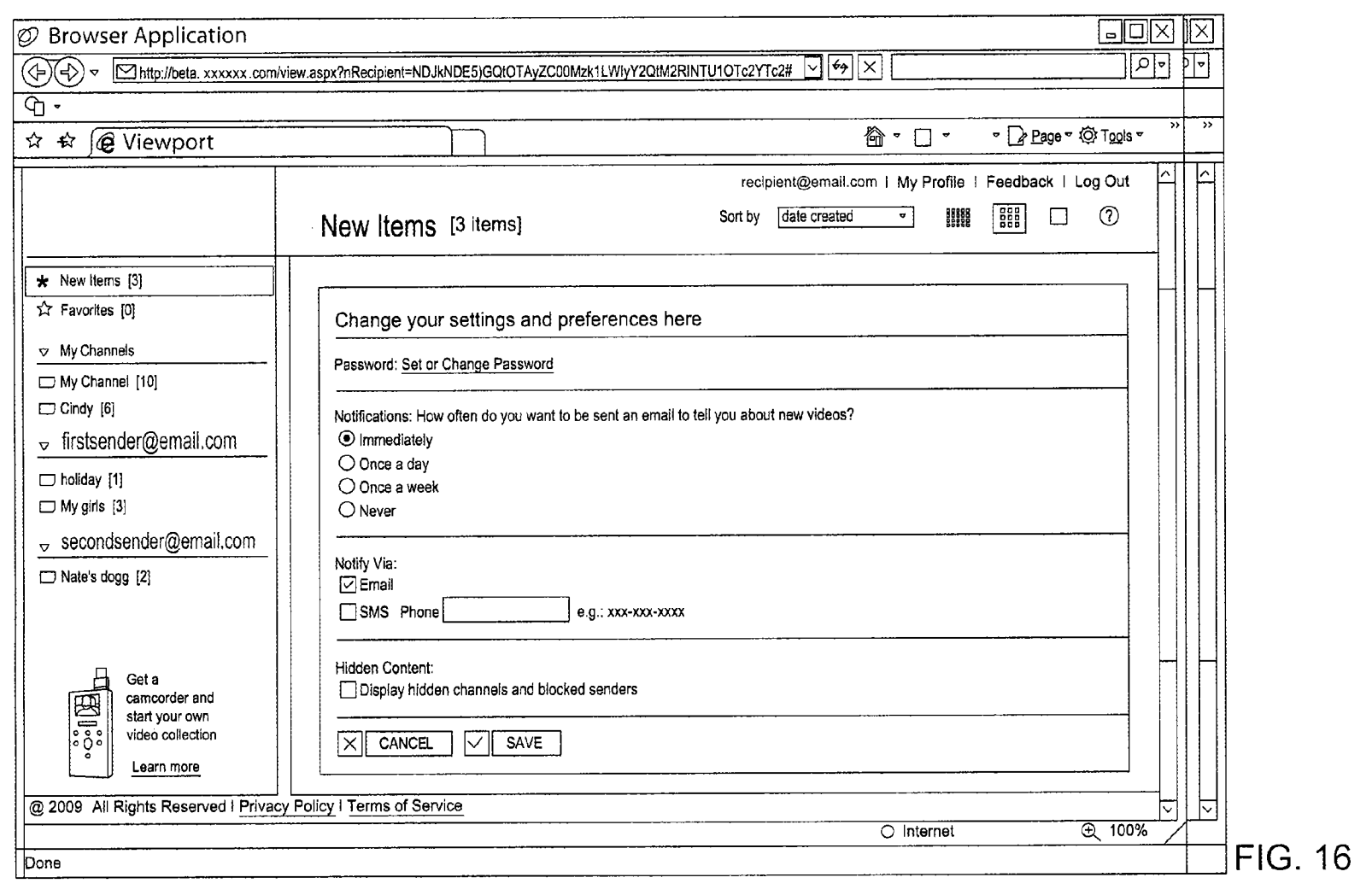

FIG. 16 is a screenshot of a viewport 1600 configured to allow a recipient to configure the settings of the viewport 1600, according to one embodiment of the invention. As shown, the recipient may change various settings and preferences, including how often to receive a notification alerting the recipient about additional media items. For example, the recipient may set a notification preference to receive notifications immediately, once a day, once a week, never, or at any other interval. Additionally, the recipient may select the medium by which the notification is to be received. For example, the recipient may choose to receive e-mail notifications, text message notification, or notifications via any other mode of communication. Other settings and preferences are also within the scope of embodiments of the invention. Additionally, in some embodiments, a recipient is able to "block" a sender so as to not receive any media items that the sender adds to a channel that the sender shares with the recipient.

Advantageously, embodiments of the invention provide more efficient and intuitive systems and methods for sharing media items with one or more persons. From the sender's perspective, embodiments of the invention allow for an easy-to-use drag-and-drop technique, which is more user-friendly than conventional techniques. Additionally, the sender can easily modify the listing of recipients associated with a channel to deny the removed recipients any further access to the media items associated with the channel. This feature is a departure from conventional techniques, such as e-mailing a media item to a recipient, since using the conventional email technique, once the recipient receives the media item, the sender has no control over what the recipient can do with the media item. Furthermore, embodiments of the invention provide a much easier method for sharing content, when compared to prior art techniques. In particular, frequent sharing of content with a recipient is made easy. Once a channel is established, media items can be added and/or removed from being shared with one or more recipients via simple dragging-and-dropping. This technique for adding/removing media items from being shared involves fewer steps than conventional sharing methods and is implemented in a way that would be very familiar and/or intuitive to average computer users.

From the recipient's perspective, embodiments of the invention allow media items from multiple sources to be aggregated into a single viewport, providing a cohesive and unified approach to media items received from others. Additionally, since the media items are stored remotely on a server, the recipients are able to access the media items on-the-go, providing for additional portability of the media items shared with the recipient. Further, since the viewport may be implemented using various platforms (e.g., desktop application, web interface, mobile device application, set-top box, web-enabled TV, etc.), the recipient can access the media items via whatever platform is the most well-suited for the recipient's specific purpose. Accordingly, embodiments of the invention facilitate accessibility to the media items by the recipient, overcoming one or more of the problems associated with conventional techniques.

While the forgoing is directed to embodiments of the present invention, other and further embodiments of the invention may be devised without departing from the basic scope thereof. For example, aspects of the present invention may be implemented in hardware or software or in a combination of hardware and software. In addition, one embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A method for enabling media items to be shared between two or more persons, the method comprising:
    receiving a media item from a first computing device;
    storing the media item in a storage memory;
    associating the media item with at least a first channel of a plurality of channels, wherein each channel is defined by a first set of media items and a first set of recipients and wherein each channel has an associated set of permissions for granting the recipients access to the first media items;
    inheriting, by the media item, the first channel permissions to view, download or share the media item; and
    allowing each of the recipients in the first set of recipients to access each of the media items included in the first set of media items from one or more other computing devices;
    allowing the recipients to block media content and notifications from a sender;
    upon receiving an indication from the first computing device to disassociate the first media item from the first channel, removing the first item from the first set of media items so that the recipients included in the first set of recipients are no longer permitted to access the media; and
    upon receiving an indication from the first computing device to disassociate a first recipient from the first channel, removing a first recipient from the first set of recipients so that the first recipient is no longer permitted to access the media item and notifying the first recipient of changes to the permissions associated with the media item.

2. The method of claim 1, wherein the storage memory comprises a database coupled to the computer system.

3. The method of claim 1, further comprising generating a notification indicating that each recipient included in the first set of recipients has permission to access each of the media items included in the first set of media items.

4. The method of claim 3, further comprising transmitting the notification to each recipient included in the first set of recipients.

5. The method of claim 4, wherein the notification comprises an electronic mail notification.

6. The method of claim 5, wherein the electronic mail notification includes a link that, when selected by a recipient included in the first set of recipients from a second computing device, causes a viewport application to be executed on the second computing device.

7. The method of claim 3, wherein the notification comprises a social network feed, a Really Simple Syndication (RSS) feed, or a text message.

8. A non-transitory computer-readable storage medium storing instructions that, when executed by a processor, cause a computer system to share media items with one or more persons, by performing the steps of:
    receiving a media item from a first computing device;
    storing the media item in a storage memory;
    associating the media item with at least a first channel of a plurality of channels, wherein each channel is defined by a first set of media items and a first set of recipients and wherein each channel has an associated set of permissions for granting the recipients access to the first media items;
    inheriting, by the media item, the first channel permissions to view, download or share the media item; and
    allowing each of the recipients included in the first set of recipients to access each of the media items included in the first set of media items from one or more other computing devices;
    allowing the recipients to block media content and notifications from a sender;
    upon receiving an indication from the first computing device to disassociate the first media item from the first channel, removing the first item from the first set of media items so that the recipients included in the first set of recipients are no longer permitted to access the media; and
    upon receiving an indication from the first computing device to disassociate a first recipient from the first channel, removing a first recipient from the first set of recipients so that the first recipient is no longer permitted to access the media item and notifying the first recipient of changes to the permissions associated with the media item.

9. The non-transitory computer-readable storage medium of claim 8, further comprising the step of generating a notification indicating that each recipient included in the first set of recipients has permission to access the media items included in the first set of media items.

10. The non-transitory computer-readable storage medium of claim 9, further comprising the step of transmitting the notification to each recipient included in the first set of recipients.

11. The non-transitory computer-readable storage medium of claim 10, wherein the notification comprises an electronic mail notification.

12. The non-transitory computer-readable storage medium of claim 11, wherein the electronic mail notification includes a link that, when selected by a recipient included in the first set of recipients from a second computing device, causes a viewport application to be executed on the second computing device.

13. The non-transitory computer-readable storage medium of claim 8, wherein the first media item is a video file.

14. The method of claim 1, wherein the media item is included in the channel based on a visual representation associated with the media item being dragged and dropped over an area of a user interface of the first computing device that corresponds to the channel.

* * * * *